US008478636B2

(12) United States Patent
Jeffrey

(10) Patent No.: US 8,478,636 B2
(45) Date of Patent: Jul. 2, 2013

(54) METHOD AND APPARATUS FOR IMPLEMENTING A PERSONAL "GET OUT THE VOTE DRIVE" SOFTWARE APPLICATION

(76) Inventor: Scott Jeffrey, New York, NY (US)

(*) Notice: Subject to any disclaimer, the term of this patent is extended or adjusted under 35 U.S.C. 154(b) by 0 days.

(21) Appl. No.: 13/111,043

(22) Filed: May 19, 2011

(65) Prior Publication Data

US 2012/0179509 A1 Jul. 12, 2012

Related U.S. Application Data

(63) Continuation of application No. 11/891,534, filed on Aug. 9, 2007, now Pat. No. 7,970,643.

(60) Provisional application No. 60/836,712, filed on Aug. 10, 2006.

(51) Int. Cl.
*G06F 17/00* (2006.01)

(52) U.S. Cl.
USPC ............................................. 705/12; 235/386

(58) Field of Classification Search
USPC ............................................. 705/12; 235/386
See application file for complete search history.

(56) References Cited

U.S. PATENT DOCUMENTS

| 6,412,692 | B1 | 7/2002 | Miyagawa |
| 7,387,244 | B2 | 6/2008 | Bolton et al. |
| 7,406,480 | B2 | 7/2008 | Seibel et al. |
| 7,562,819 | B2 | 7/2009 | Keenan |
| 7,575,164 | B2 | 8/2009 | Reardon |
| 7,690,566 | B2 | 4/2010 | Quine et al. |
| 7,729,991 | B2 | 6/2010 | Rodriguez et al. |
| 7,953,628 | B2 | 5/2011 | Bordier |
| 2007/0016468 | A1* | 1/2007 | Campbell et al. ............... 705/12 |
| 2007/0272749 | A1 | 11/2007 | Gehrke et al. |
| 2009/0313094 | A1 | 12/2009 | Singh |

* cited by examiner

*Primary Examiner* — Thomas Dixon
(74) *Attorney, Agent, or Firm* — John J. Skinner, Jr.; Michelman & Robinson LLP

(57) ABSTRACT

A method and apparatus for a software tool that interfaces with a campaign's Field Operations and allows for voter education, motivation and getting voters out to vote is presented. The software tool incorporates a number of voter informational data fields to provide users of the software with a Voter Score, Voter Scorecard, Post-Election Voter History, Household Visualization, Voter Support Visualization, Household Mailing Labels, E-Mail Voter Footer, and Voter List of Friends and Family.

11 Claims, 38 Drawing Sheets

SCOTT JEFFREY Reports

Main Menu   Voter Lists   Walk/Call Sheet   Mailing Labels   Excel Export   Reports   Voter Search   Log Out   Help
Addl. Reports   Precincts   Manhattan   69 AD (63844, 5736)   All EDs   All Buildings
My Targets   All Phones   All Affiliations   All Genders   All Ages   All Parties   All Districts   All ZIPs   Clear
☑ Full Households   All Supports   All Opponents   All Issues   All Activities   All Petitions   All Contacts   Filter Top 20 NYC Poll Sites by Targets

Top 20 NYC Poll Sites by Targets

| | My Targets | Non-Target Voters | My Voters |
|---|---|---|---|
| 234 WEST 109 STREET at PS 165 | 680 | 6080 | 6760 |
| 163 WEST 97 STREET at PS 163 | 612 | 7278 | 7890 |
| 150 WEST 105 STREET at PS 145 | 368 | 2715 | 3083 |
| 140 WEST 102 STREET at WESTSIDE HIGH SCHOOL | 367 | 5174 | 5541 |
| 125 WEST 109 STREET at UTACPT | 238 | 2066 | 2304 |
| 230 WEST 103 STREET at MARSEILLES APTS | 227 | 2061 | 2288 |
| 593 COLUMBUS AVENUE at GODDARD RIVERSIDE | 223 | 2852 | 3075 |
| 32 WEST 92 STREET at PS 84 | 214 | 3496 | 3710 |
| 123 MORNINGSIDE DRIVE at PS 36 | 212 | 1251 | 1463 |
| 411 WEST 116 STREET at WEIN HALL | 204 | 1173 | 1377 |
| 154 WEST 93 STREET at PS 118 | 200 | 2631 | 2831 |
| 11 WEST 102 STREET at KURT & LEAH APTS | 190 | 1782 | 1972 |
| 735 WEA (H/A W 96 ST) at PS 75 | 183 | 1846 | 2029 |
| 2050 8 AVENUE at CHARLES HILL TOWER | 172 | 1688 | 1860 |
| 549 RIVERSIDE DR at COLUMBIA UNIV HOUSES | 160 | 790 | 950 |
| 3150 BROADWAY at GEN GRANT HOUSES | 115 | 966 | 1081 |
| 132 WEST 89 STREET at PS 166 | 112 | 1549 | 1661 |
| 601 WEST 113 STREET at FOREST CHAMBERS | 98 | 773 | 871 |
| 467 CENTRAL PARK WEST at 467 CENTRAL PARK W | 96 | 697 | 793 |
| 414 WEST 120 ST at COLUMBIA UNIV HOUSE | 95 | 415 | 510 |

Abraham Lincoln
Democrat for 69th Assembly District

Data By: Prime NY
Powered By: Lincoln Voters™

Number of Voters: 1219

| ☐ | Voter | Address |
|---|---|---|
| ☐ | PETER E LEWINE - 6.7*<br>Democrat - Male, 58 | 12 W 96TH ST<br>Apt 4B |
| ☐ | HANS P LEVIN - 3.3*<br>Democrat - Male, 39 | 12 W 96TH ST<br>Apt 4B |
| ☐ | ELENA RAMOS VELITA - 0.0<br>Democrat - Female, 40 | 12 W 96TH ST<br>Apt 4B |
| ☐ | ROSANNA L RAMOS-VELITA<br>- 2.5<br>Unaffiliated - Female, 43 | 12 W 96TH ST<br>Apt 4B |
| ☐ | EDITH M FEINSTEIN - 0.0<br>Democrat - Female, 76 | 12 W 96TH ST<br>Apt 4C |

Scott Jeffrey sent this e-mail to James Jorasch courtesy of Legalize Votes,
Americans Speaking Out to Legalize Our Lives Your Voter Score is 2.5. Click here to view your full Voter Scorecard.
Scott's Voter Score is 10.0. Click here to view his full Voter Scorecard.

Please be sure to vote:
• in the General Election on November 7, 2006.

You are registered to vote as a UNAFFILIATED on E 39TH ST.
Your poll site location is 145 EAST 39 STREET at TEN EYCK TROUGHTON (click link for map).

Scott Jeffrey has endorsed and personally asks you to vote for:
• Scott Stringer for Manhattan Borough President
  No Primary Opposition, Endorsed for General Election
  The Stringer campaign used Lincoln Voters software to win the Primary.

Legalize has endorsed these candidates in your district:
• Freddy Ferrer for Mayor
  Former Bronx BP Ferrer is an early and outspoken supporter of same-sex marriage.
  Ferrer will withdraw the City's appeal of the Justice Ling-Cohan decision that
  legalized same-sex marriage in New York City and immediately begin issuing
  marriage licenses.
• Betsy Gotbaum for Public Advocate
  Advocate Gotbaum co-sponsored City Council Resolution 171, calling upon the New
  York State Legislature to pass the New York "Right to Marry" Bill.
• William Thompson, Jr. for Comptroller
  As custodian of New York City's pension system, Comptroller Thompson voted to
  extend full benefits to the same-sex spouses of City employees.
• Scott Stringer for Manhattan Borough President
  Assembly Member Stringer is an original co-sponsor of the New York "Right to
  Marry" Bill, fighting for gay marriage before it was popular.

Your friend Scott Jeffrey (scott@legalize.com) sent you this e-mail as part of his get-out-the-vote
drive on our Legalize Votes website. We will never contact you directly unless you join as a member.
Click here to block future e-mails from Scott.
Click here to read our privacy policy.
Click here to register with Legalize Votes.

 Legalize® and Legalize Votes™ are trademarks of Scott Jeffrey. Powered By:
Copyright © 1996-2006 Scott Jeffrey. All rights reserved.   Lincoln Voters™

Fig. 4

Register with Legalize [TEST]
Step 1: Create Your Account

Step 1A: Basic Account Information

Login Username:  
First Name:      E-mail Address:  
                 Last Name:

Your First and Last Name must match your voter registration record.

Step 1B: New York State Voter Registration Status

I am not a Registered Voter in New York.  
I am a Registered Voter in New York. *(Confirm below)*

Middle Initial:       *(leave blank if none)*  
Month & Year of Birth: January  YYYY  
Building Number:

(For example, if you live at 350 Fifth Avenue, enter "350" as your Building Number.)

PRIVACY NOTE: We require you to confirm your personal information to protect your privacy. Legalize already has this information as part of your voter registration record. By requiring confirmation, we help prevent others from masquerading as you.

Create Your Account

Legalize® is a registered trademark of Scott Jeffrey.  
Copyright © 1996-2006 Scott Jeffrey. All rights reserved.

Powered By:  
Lincoln Voters™

Fig. 7

CELEB HOUND Edit Voter [TEST]

Home | My Voter Drive | Find Friends | Edit Celeb Hound | Log Out | Help

CELEB HOUND
Myself & Member – Unregistered – Male, 38
No Address
No City,

Score: 0.0
Presidential Voter: NO
Gubernatorial Voter: NO
Mayoral Voter: NO
*Primary Voter: NO

| My Account | My Profile | My Endorsement | Voter History |

Relationship:
Myself

Account Information:
E-Mail: celebhound@votejeffrey.com
User Name: celebhound
New Password:
Confirm Password:

Non-Voter Base Record:
First Name: CELEB   Last Name: HOUND
Female   Male   Age: 38   County: Manhattan
Mapped Address
Address:   Streets in Manhattan
              10TH AVE
              11TH AVE
              12TH AVE
              1ST AVE
                        Apt:
City: NEW YORK   State:   ZIP: AUTO
Unmapped Address
Address:                 Apt:
City:            State:   ZIP:

PRIVACY PROTECTION: Your e-mail address is hidden and can only be seen by your mutual friends.

Save Voter and Go Back    Save Voter    Cancel and Go Back

Legalize® and Legalize Votes™ are trademarks of Scott Jeffrey.
Copyright © 1996–2006 Scott Jeffrey. All rights reserved.

Powered By:
Lincoln Voters™

Fig. 8

CELEB HOUND Find Friends [TEST]

| Home | My Voter Drive | Find Friends | Edit Celeb Hound | Log Out | Help |

All Counties     Apply Search     Add Friend

First Name:     ☑ Exact Last Name:

Number of Voters: 0

| Voter | Address | Contact | Legalize Issues | Pledges to Vote |

* Please Enter the First and Last Name of Your Friend *

Please search for your friends who are registered NYC Voters. Marking them as a Friend adds them to your Voter Drive. To protect your privacy, please only add personal friends to your list. Your e-mail address, support for Legalize Issues, pledges to vote, and candidate endorsement will be shared with everyone on your Voter Drive.

By clicking on your friends' names, you may also begin to enter their e-mail addresses. This will allow you to send them reminders to vote, personalized with their individual polling locations. Legalize Votes will never contact your friends directly unless they choose to register as members themselves.

Note that Board of Election data is notoriously inaccurate. If you can't find your friend, sometimes the BOE data has misspellings so please uncheck Exact Last Name and enter just the first few letters (three minimum). Sometimes the BOE data is old, so try your friend's maiden name if she is married.

Selected Voters are My Friends

 Legalize® and Legalize Votes™ are trademarks of Scott Jeffrey.
Copyright © 1996-2006 Scott Jeffrey. All rights reserved.

Powered By:
Lincoln Voters™

Fig. 10

CELEB HOUND Voter Drive [TEST]

Home    My Voter Drive    Find Friends    Edit Celeb Hound    Log Out    Help

All Genders    All Ages    All Parties    Apply Filters

Number of Voters: 18

| | Voter | Address | Contact | Legalize Issues | | | Pledges to Vote |
|---|---|---|---|---|---|---|---|
| | WOODY ALLEN - 0.0<br>Democrat - Male, 70 | E 85TH ST<br>NEW YORK | Friend | | | | |
| | MATTHEW BRODERICK - 2.5<br>Democrat - Male, 44 | CHARLTON ST<br>NEW YORK | Friend | | | | |
| | STEVE BUSCEMI - 7.8\*<br>Democrat - Male, 48 | 5TH ST<br>BROOKLYN | Friend | | | | |
| | JENNIFER CONNELLY - 1.1<br>Democrat - Female, 35 | 7TH AVE<br>BROOKLYN | Friend | | | | |
| | ROBERT DENIRO - 1.2<br>Democrat - Male, 62 | HUDSON ST<br>NEW YORK | Friend | | | | |
| | ALAN FRANKEN - 8.8\*<br>Democrat - Male, 55 | RIVERSIDE DR<br>NEW YORK | Friend | | | | |
| | ARTHUR GARFUNKEL - 1.2<br>Democrat - Male, 64 | E 79TH ST<br>NEW YORK | Friend | | | | |
| | *CELEB HOUND* - N/A<br>*Unregistered* - Male, 38 | No Street<br>No City | Myself & Member<br>celebhound<br>@votejeffrey.com | | | | |
| ☐ | SCOTT JEFFREY - 10.0<br>Republican - Male, 38 | CENTRAL PARK W<br>NEW YORK | Mutual Friend & Admin<br>scott@legalize.com | 1-SSM<br>1-MJ | 1-Dance<br>1-Smoke | General | |
| ☐ | CHRISTOPHER NOTH - 2.5<br>Democrat - Male, 51 | E 9TH ST<br>NEW YORK | Friend<br>chrisnoth<br>@votejeffrey.com | | | | |
| | SARAH JESSICA PARKER -<br>3.8\*<br>Democrat - Female, 41 | CHARLES ST<br>NEW YORK | Friend | | | | |

E-Mail Selected Voters

Legalize® is a registered trademark of Scott Jeffrey.
Copyright © 1996-2006 Scott Jeffrey. All rights reserved.

Powered By:
Lincoln Voters™

Fig. 12

CELEB HOUND Edit Voter [TEST]

Home　　My Voter Drive　　Find Friends　　Edit Celeb Hound　　Log Out　　Help

WOODY ALLEN
Friend - Democrat - Male, 70

E 85TH ST
NEW YORK, NY

Score: 0.0
Presidential Voter: NO
Gubernatorial Voter: NO
Mayoral Voter: NO
*Primary Voter: NO

| Friend's E-Mail | Friend's Profile | Friend's Endorsement | Voter History |

Please Contact Friend and Enter His Responses Below

Support for Legalize Issues:

Legalize Same-Sex Marriage:　No Response
Legalize Marijuana:　No Response
Legalize Dancing (in bars):　No Response
Legalize Smoking (in bars):　No Response

Polling Location and Map:
45 EAST 81 ST (H/A 82 ST) at PS 6

Pledge to Vote:
☐ Pledge to Vote in the General Election on Tues, Nov 8

Pledge to Vote for Legalize Candidates:
☐ Pledge to Vote for Freddy Ferrer for Mayor
☐ Pledge to Vote for Betsy Gotbaum for Public Advocate
☐ Pledge to Vote for William Thompson, Jr. for Comptroller
☐ Pledge to Vote for Scott Stringer for Manhattan Borough President

*Legalize Endorsement Pending for City Council, District 4*

PRIVACY PROTECTION: Your friend's support for Legalize Issues and pledges to vote are always hidden and will not be seen by anyone.

Save Voter and Go Back　　Save Voter　　Cancel and Go Back

Legalize® and Legalize Votes™ are trademarks of Scott Jeffrey.
Copyright © 1996-2006 Scott Jeffrey. All rights reserved.

Powered By:
Lincoln Voters™

Fig. 14

CELEB HOUND Who We Are [TEST]

Home    My Voter Drive    Find Friends    Edit Celeb Hound      Log Out    Help

Who We Are    All Campaigns

Membership

We are 1170 Members, 396 NYC Voters, and 292 Potential Primary Voters.

|                | Totals | Manhattan | Bronx | Brooklyn | Queens | Staten Island | Outside NYC |
|----------------|--------|-----------|-------|----------|--------|---------------|-------------|
| Members        | 1167   | 685       | 32    | 194      | 129    | 11            | 116         |
| NYC Voters     | 393    | 237       | 9     | 80       | 60     | 7             | N/A         |
| Democrats      | 292    | 174       | 6     | 61       | 46     | 5             | N/A         |
| Republicans    | 21     | 17        | 1     | 1        | 2      |               | N/A         |
| Third Party    | 26     | 15        |       | 6        | 4      | 1             | N/A         |
| No Party Affl. | 54     | 31        | 2     | 12       | 8      | 1             | N/A         |

NYC Voter Demographics

Of those of us registered to vote, we are 70% Female and 29% Male.
By age, we are 61% Under 30, 28% 30 to 39, and 10% 40 and Over.

NYC Voter History

Of those of us registered to vote, 85% Voted for President in 2004.
Yet only 24% Voted for Mayor in 2001.
And only 10% Voted in the Primaries and only 10% Voted in the Run-Off in 2001.

**\* 1054 New Yorkers = 36 Votes?! \***
Will Legalize Voters Step Up in 2005?

We are 1054 New Yorkers, yet based on past experience only 36 of us are likely to vote in the Democratic Primary this year. We claim to strongly support same-sex marriage, but do we really? Are we ready to take political action?

As Legalize Voters, we are empowered with endorsements, reminders, and even our poll site locations. There are 250 of us who are Democrats and voted for president last year. If just this small group steps up to vote in the Democratic Primary this year, we will have outperformed our expected turnout by over 500 percent. This alone will be seen as a miracle. Professional get-out-the-vote efforts are targeted at likely voters, and rarely have significantly raised general voter turnout.

And our exact turnout will be measurable. After every election, the Board of Elections publishes a list of everyone who voted. Legalize Votes will ingest this data and we all will know how many of us voted. For the first time, we will be held accountable.

Fig. 19

Furthermore, we all can participate, not just registered Democrats. As Legalize Voters, we are empowered to build our own personal get-out-the-vote drive of friends and family. By cajoling our Democratic friends to vote, we all can have a real and measurable impact. Together we can deliver not just 36 votes, or even 1054 votes, but literally ten thousand votes or more, if every one of us did our part.

But again, even if we only deliver a couple hundred votes, we will stun the New York political establishment and demonstrate that same-sex marriage is a winning issue for politicians.

Back to the original question of who we are. We are young New Yorkers who care deeply about gay marriage rights. We will know whether our professed concern translates into political action on Tuesday, September 13.

 Legalize® and Legalize Votes™ are trademarks of Scott Jeffrey.
Copyright © 1996-2006 Scott Jeffrey. All rights reserved.

Powered By:
Lincoln Voters™

Fig. 20

CELEB HOUND Campaigns [TEST]

Home | My Voter Drive | Find Friends | Edit Celeb Hound | Log Out | Help

Who We Are | All Campaigns

| Candidate | Office | Election | Mutual Friends | Friends | Legalize Voters | Legalize Network |
|---|---|---|---|---|---|---|
| Ferrer | Mayor | General | 0 Pledges | 1 Pledges | 9 Pledges | 0 Pledges |
| Gotbaum | Pub. Adv. | General | 0 Pledges | 0 Pledges | 11 Pledges | 0 Pledges |
| Thompson | Compt. | General | 0 Pledges | 0 Pledges | 17 Pledges | 0 Pledges |
| Stringer | Boro. Pres. | General | 0 Pledges | 0 Pledges | 8 Pledges | 0 Pledges |
| Markowitz | Boro. Pres. | General | 0 Pledges | 0 Pledges | 3 Pledges | 0 Pledges |
| Gerson | Council | General | 0 Pledges | 0 Pledges | 2 Pledges | 0 Pledges |
| Quinn | Council | General | 0 Pledges | 0 Pledges | 5 Pledges | 0 Pledges |
| Brewer | Council | General | 0 Pledges | 0 Pledges | 3 Pledges | 0 Pledges |
| Jackson | Council | General | 0 Pledges | 0 Pledges | 0 Pledges | 0 Pledges |
| Koppell | Council | General | 0 Pledges | 0 Pledges | 0 Pledges | 0 Pledges |
| Palma | Council | General | 0 Pledges | 0 Pledges | 0 Pledges | 0 Pledges |
| Liu | Council | General | 0 Pledges | 0 Pledges | 0 Pledges | 0 Pledges |
| Yassky | Council | General | 0 Pledges | 0 Pledges | 0 Pledges | 0 Pledges |
| James | Council | General | 0 Pledges | 0 Pledges | 0 Pledges | 0 Pledges |
| de Blasio | Council | General | 0 Pledges | 0 Pledges | 3 Pledges | 0 Pledges |

Legalize Campaigns in Your District
Currently No Endorsed Candidates

Legalize Campaigns Outside Your District

Freddy Ferrer for Mayor

*Former Bronx BP Ferrer is an early and outspoken supporter of same-sex marriage. Ferrer will withdraw the City's appeal of the Justice Ling-Cohan decision that legalized same-sex marriage in New York City and immediately begin issuing marriage licenses.*

Betsy Gotbaum for Public Advocate

*Advocate Gotbaum co-sponsored City Council Resolution 171, calling upon the New York State Legislature to pass the New York "Right to Marry" Bill.*

William Thompson, Jr. for Comptroller

*As custodian of New York City's pension system, Comptroller Thompson voted to extend full benefits to the same-sex spouses of City employees.*

Fig. 21

Scott Stringer for Manhattan Borough President
Assembly Member Stringer is an original co-sponsor of the New York "Right to Marry" Bill, fighting for gay marriage before it was popular.

Marty Markowitz for Brooklyn Borough President
BP Markowitz had opposed same-sex marriage but now supports it, saying with his famed Brooklyn eloquence that "love is love".

Alan Gerson for City Council (Chinatown, Little Italy, Lower Manhattan and Tribeca)
Council Member Gerson co-sponsored City Council Resolution 171, calling upon the New York State Legislature to pass the New York "Right to Marry" Bill.

Christine Quinn for City Council (Chelsea-Clinton, Greenwich Village, Flatiron, Midtown and Soho)
Council Member Quinn is a 39-year-old youth candidate who co-sponsored City Council Resolution 171, calling upon the New York State Legislature to pass the New York "Right to Marry" Bill.

Gale Brewer for City Council (Upper West Side)
Council Member Brewer co-sponsored City Council Resolution 171, calling upon the New York State Legislature to pass the New York "Right to Marry" Bill.

Robert Jackson for City Council (Inwood, Washington Heights and West Harlem)
Council Member Jackson co-sponsored City Council Resolution 171, calling upon the New York State Legislature to pass the New York "Right to Marry" Bill.

G. Oliver Koppell for City Council (Bedford Park, Fieldston, Jerome Park, Norwood and Riverdale)
Council Member Koppell co-sponsored City Council Resolution 171, calling upon the New York State Legislature to pass the New York "Right to Marry" Bill.

Annabel Palma for City Council (Soundview, Parkchester, Castle Hill)
Council Member Palma is a 33-year-old youth candidate who co-sponsored City Council Resolution 171, calling upon the New York State Legislature to pass the New York "Right to Marry" Bill.

John Liu for City Council (Flushing North)
Council Member Liu co-sponsored City Council Resolution 171, calling upon the New York State Legislature to pass the New York "Right to Marry" Bill.

David Yassky for City Council (Greenpoint, Williamsburg, Brooklyn Heights, DUMBO, and Park Slope)
Council Member Yassky co-sponsored City Council Resolution 171, calling upon the New York State Legislature to pass the New York "Right to Marry" Bill.

Letitia James for City Council (Clinton Hill, Fort Greene and Prospect Heights)

Fig. 22

Council Member James co-sponsored City Council Resolution 171, calling upon the New York State Legislature to pass the New York "Right to Marry" Bill.

Bill de Blasio for City Council (Carroll Gardens, Kensington, Park Slope and Windsor Terrace)
Council Member de Blasio co-sponsored City Council Resolution 171, calling upon the New York State Legislature to pass the New York "Right to Marry" Bill.

 Legalize® and Legalize Votes™ are trademarks of Scott Jeffrey.
Copyright © 1996-2006 Scott Jeffrey. All rights reserved.

Powered By:
Lincoln Voters™

Fig. 23

SCOTT JEFFREY Voter Lists

Main Menu | Voter Lists | Walk/Call Sheet | Mailing Labels | Excel Export | Reports | Voter Search | Log Out | Help Door Knocking | Precincts | Manhattan | 69 AD (63844, 5736) | 1 ED (620, 42) | | | |

My Targets | All Phones | | All Affiliations | All Genders | All Ages | All Parties | All Buildings | All ZIPs | Clear
Full Households | All Supports | | All Opponents | All Issues | All Activities | All Petitions | All Contacts | Filter Number of Voters: 83      Poll Site: 593 COLUMBUS AVENUE at GODDARD RIVERSIDE

| Voter | Address | Phone | Support Ranking | Issues & Affils | Last Contact |
|---|---|---|---|---|---|
| 251 CENTRAL PARK W (map) | | | | | |
| ☐ SARA R TRACHTENBERG - 2.2\* Democrat - Female, 29 | 251 CENTRAL PARK W Apt 7B | Needs Lookup | | | |
| ☐ MORTON TRACHTENBERG - 7.8\* Democrat - Male, 72 | 251 CENTRAL PARK W Apt 7B | Needs Lookup | | | |
| ☐ FAY E ROBIN - 7.8\* Democrat - Female, 63 | 251 CENTRAL PARK W Apt 7B | Needs Lookup | | | |
| ☐ MELISSA R TRACHTENBERG - 0.0 Democrat - Female, 29 | 251 CENTRAL PARK W Apt 7B | Needs Lookup | | | |
| 257 CENTRAL PARK W (map) | | | | | |
| ☐ SHAYNE F BERNSTEIN - 4.4\* Democrat - Female, 36 | 257 CENTRAL PARK W Apt 7G | Needs Lookup | | | |

☐ Upd. Supprt: No Response   ☐ Upd. Washington: No Response   ☐ Upd. Jefferson: No Response   ☐ Upd. Roosevelt: No Response ☐ Add New Contact   Type: In Person   Result: Success   Date: Jul 31 (Mon)   Subject:     Update Voters Abraham Lincoln
Democrat for 69th Assembly District Data By: Prime NY    Powered By: Lincoln Voters™

Fig. 25

SCOTT JEFFREY Edit Voter

Main Menu | Voter Lists | Walk/Call Sheet | Mailing Labels | Excel Export | Reports | Voter Search | Log Out | Help

SARA R TRACHTENBERG
Democrat - Female, 29
251 CENTRAL PARK W, Apt 7B (map)
NEW YORK, NY 10024
May 30, 1977    Voter ID: 304931876    AD/ED: 69/1

Score: 2.2\*
Presidential Voter: NO
Gubernatorial Voter: YES
Mayoral Voter: YES
*Primary Voter: YES

| Voter Record | User Account | Political Profile | Contact History | Voter History | Friend's E-Mail | Friend's Profile |

Corrected Voter Status:
Unconfirmed   Valid Voter   Moved   Deceased

Corrected Address:
Current Address Is Correct
Corrected Apt:

Phone Numbers:
Provided Phone:
   Unconfirmed   Bad   Good

☐ Attempted Phone Lookup for SARA TRACHTENBERG
   WHITEPAGES   DA PLUS

Alternate Phone 1:
   Unconfirmed   Bad   Good

Alternate Phone 2:
   Unconfirmed   Bad   Good

E-Mail Address:
Non-Integrated E-Mail:

Save Voter and Go Back    Save Voter    Cancel and Go Back

Abraham Lincoln
Democrat for 69th Assembly District

Data By: Prime NY    Powered By: Lincoln Voters™

SCOTT JEFFREY Edit Voter

Main Menu | Voter Lists | Walk/Call Sheet | Mailing Labels | Excel Export | Reports | Voter Search | Log Out | Help

SARA R TRACHTENBERG
Democrat - Female, 29
251 CENTRAL PARK W, Apt 7B (map)
NEW YORK, NY 10024
May 30, 1977    Voter ID: 304931876    AD/ED: 69/1

Score: 2.2*
Presidential Voter: NO
Gubernatorial Voter: YES
Mayoral Voter: YES
*Primary Voter: YES

| Voter Record | User Account | Political Profile | Contact History | Voter History | Friend's E-Mail | Friend's Profile |

Please Contact Voter and Enter Her Responses Below

Support for Lincoln:
Support for Lincoln: No Response

Opponents:
George Washington: No Response
Thomas Jefferson: No Response
Theodore Roosevelt: No Response

Motivating Issues:
☐ Affordable Housing   ☐ Crime       ☐ Healthcare   ☐ Property Taxes
☐ Quality of Life      ☐ Other:

Affiliations:
☐ Hispanic    ☐ Home Owner    ☐ 1199    ☐ ESPA
☐ Other:

Polling Location and Map:
593 COLUMBUS AVENUE at GODDARD RIVERSIDE

PRIVACY PROTECTION: Your friend's support for Abraham Lincoln and motivating issues are always hidden and will not be seen by anyone.

Save Voter and Go Back    Save Voter    Cancel and Go Back

Abraham Lincoln
Democrat for 69th Assembly District

Data By: Prime NY    Powered By: Lincoln Voters™

Fig. 28

SCOTT JEFFREY Edit Voter

Main Menu   Voter Lists   Walk/Call Sheet   Mailing Labels   Excel Export   Reports   Voter Search   Log Out   Help

SARA R TRACHTENBERG
Democrat - Female, 29
251 CENTRAL PARK W, Apt 7B (map)
NEW YORK, NY 10024
May 30, 1977   Voter ID: 304931876   AD/ED: 69/1

Score: 2.2\*
Presidential Voter:   NO
Gubernatorial Voter:   YES
Mayoral Voter:   YES
\*Primary Voter:   YES

| Voter Record | User Account | Political Profile | Contact History | Voter History | Friend's E-Mail | Friend's Profile |

☐ ADD NEW Contact Record: (Check to Activate Controls)
Type: In Person 🗓   Result: Success 🗓   Date: Jul 31 (Mon) 🗓

Subject:

Contact History: (Check to Mark Record for Deletion)

\* Never Contacted \*

Contact Notes: ☐ Needs Follow-Up   ☐ Do Not Contact

Field Organizer Notes:

Petition Record:
Status:   Not Approached
Witness:   Not Tracked 🗓   Date Signed: Not Signed   🗓
Volume:   Page:   New Name:
Line:

Save Voter and Go Back   Save Voter   Cancel and Go Back

Abraham Lincoln
Democrat for 69th Assembly District

Data By:   Powered By:
Prime_NY   Lincoln Voters™

Fig. 29

SCOTT JEFFREY Edit Voter

Main Menu | Voter Lists | Walk/Call Sheet | Mailing Labels | Excel Export | Reports | Voter Search | Log Out | Help

SARA R TRACHTENBERG
Democrat - Female, 29
251 CENTRAL PARK W, Apt 7B (map)
NEW YORK, NY 10024
May 30, 1977   Voter ID: 304931876   AD/ED: 69/1

Score: 2.2\*
Presidential Voter: NO
Gubernatorial Voter: YES
Mayoral Voter: YES
\*Primary Voter: YES

| Voter Record | User Account | Political Profile | Contact History | Voter History | Friend's E-Mail | Friend's Profile |

Relationship:
☐ My Friend

Contact Information:
E-Mail:

E-Mail Contact History:

\* Never Contacted \*

Send E-Mail to Friend

PRIVACY PROTECTION: Entering your friend's e-mail address only allows you to contact them. They will not receive any e-mail directly from Lincoln.

Save Voter and Go Back    Save Voter    Cancel and Go Back

Abraham Lincoln
Democrat for 69th Assembly District

Data By:          Powered By:
Prime NY        Lincoln Voters™

Fig. 30

SCOTT JEFFREY Edit Voter

Main Menu | Voter Lists | Walk/Call Sheet | Mailing Labels | Excel Export | Reports | Voter Search | Log Out | Help

SARA R TRACHTENBERG
Democrat - Female, 29
251 CENTRAL PARK W, Apt 7B (map)
NEW YORK, NY 10024
May 30, 1977    Voter ID: 304931876    AD/ED: 69/1

Score: 2.2\*
Presidential Voter: NO
Gubernatorial Voter: YES
Mayoral Voter: YES
*Primary Voter: YES

| Voter Record | User Account | Political Profile | Contact History | Voter History | Friend's E-Mail | Friend's Profile |

Reminder: Please use the Political Profile tab to Officially ID Voters

Motivating Issues:
☐ Affordable Housing   ☐ Crime       ☐ Healthcare   ☐ Property Taxes
☐ Quality of Life      ☐ Other:

Support for Lincoln:
Support for Lincoln: No Response

Affiliations:
☐ Hispanic     ☐ Home Owner    ☐ 1199    ☐ ESPA
☐ Other:

Opponents:
George Washington: No Response
Thomas Jefferson: No Response
Theodore Roosevelt: No Response

Polling Location and Map:
593 COLUMBUS AVENUE at GODDARD RIVERSIDE

PRIVACY PROTECTION: Your friend's support for Abraham Lincoln and motivating issues are always hidden and will not be seen by anyone.

Save Voter and Go Back    Save Voter    Cancel and Go Back

Abraham Lincoln
Democrat for 69th Assembly District

Data By: Prime NY    Powered By: Lincoln Voters™

Fig. 31

SCOTT JEFFREY Voter Search

Main Menu | Voter Lists | Walk/Call Sheet | Mailing Labels | Excel Export | Reports | Voter Search | Log Out | Help Door Knocking ☐ | Name & Addy | ☑ Fuzzy Logic | Manhattan | House Num.: 360 | Streets in Manhattan: 10TH AVE, 11TH AVE | | Clear Search Add Non-Voter | Voter IDs | First Name: SCOTT | ☑ Exact Last Name: JEFFREY | | | | Apply Search Number of Voters: 6

| | Voter | Address | Phone | Support Ranking | Issues & Affils | Last Contact |
|---|---|---|---|---|---|---|
| ☐ | *SCOTT B CASIAS* - 2.5* Independence - Male, 36 | 360 CENTRAL PARK W Apt 5A, NEW YORK | Needs Lookup | | | |
| ☐ | *SCOTT M GILBERT* - 0.0 Unaffiliated - Male, 33 | 360 CENTRAL PARK W Apt 16G, NEW YORK | Needs Lookup | | | |
| ☐ | *SEYMOUR B JACOBSON* - 0.0 Unaffiliated - Male, 88 | 360 CENTRAL PARK W Apt 10E, NEW YORK | Needs Lookup | | | |
| ☐ | *STEPHANIE L JACOBY* - 2.2* Democrat - Female, 30 | 360 CENTRAL PARK W Apt 14E, NEW YORK | Needs Lookup | | | |
| ☐ | DONALD JEFFREY - 2.2 Democrat - Male, 59 | 295 CENTRAL PARK W Apt 3C, NEW YORK | Needs Lookup | | | |
| ☐ | *SCOTT A JEFFREY* - 5.0 Republican - Male, 38 | 360 CENTRAL PARK W Apt 10D, NEW YORK | Needs Lookup | 1 - Strong Support | Quality of Life Home Owner | SCOTT JEFFREY - May 31 (Wed) test abe69ad |

☐ Upd. Supprt: No Response    ☐ Upd. Washington: No Response    ☐ Upd. Jefferson: No Response    ☐ Upd. Roosevelt: No Response ☐ Add New Contact    Type: In Person    Result: Success    Date: Jul 31 (Mon)    Subject:

Update Voters

Abraham Lincoln
Democrat for 69th Assembly District

Data By: Prime NY    Powered By: Lincoln Voters™

Fig. 32

My Targets / Full HH / Manhattan / 69 AD / 1 ED  Canvasser: _____  Phone: _____
Date: _____  Time: _____  Entered By: _____

Number of Voters: 83   Poll Site: 593 COLUMBUS AVENUE at GODDARD RIVERSIDE   Back to Voter List

| Name | Address | Phone | Lincoln | Opponent | Issues | Last Contact | Result |
|---|---|---|---|---|---|---|---|
| SARA TRACHTENBERG - 2.2*<br>Democrat - Female, 29 | 251 CENTRAL PARK W<br>Apt 7B | | 1 2 3<br>4 5 | GW+ TJ+ TR+<br>GW- TJ- TR- | AH C HC<br>PT QL O | | NH DNC<br>MV D |
| Old Notes: | | | Notes: | | | | |
| MORTON TRACHTENB... - 7.8*<br>Democrat - Male, 72 | 251 CENTRAL PARK W<br>Apt 7B | | 1 2 3<br>4 5 | GW+ TJ+ TR+<br>GW- TJ- TR- | AH C HC<br>PT QL O | | NH DNC<br>MV D |
| Old Notes: | | | Notes: | | | | |
| FAY E ROBIN - 7.8*<br>Democrat - Female, 63 | 251 CENTRAL PARK W<br>Apt 7B | | 1 2 3<br>4 5 | GW+ TJ+ TR+<br>GW- TJ- TR- | AH C HC<br>PT QL O | | NH DNC<br>MV D |
| Old Notes: | | | Notes: | | | | |
| MELISSA TRACHTENB... - 0.0<br>Democrat - Female, 29 | 251 CENTRAL PARK W<br>Apt 7B | | 1 2 3<br>4 5 | GW+ TJ+ TR+<br>GW- TJ- TR- | AH C HC<br>PT QL O | | NH DNC<br>MV D |
| Old Notes: | | | Notes: | | | | |
| SHAYNE F BERNSTEIN - 4.4*<br>Democrat - Female, 36 | 257 CENTRAL PARK W<br>Apt 7G | | 1 2 3<br>4 5 | GW+ TJ+ TR+<br>GW- TJ- TR- | AH C HC<br>PT QL O | | NH DNC<br>MV D |
| Old Notes: | | | Notes: | | | | |
| DOUGLAS MARKEL - 2.2*<br>Democrat - Male, 30 | 257 CENTRAL PARK W<br>Apt 2G | | 1 2 3<br>4 5 | GW+ TJ+ TR+<br>GW- TJ- TR- | AH C HC<br>PT QL O | | NH DNC<br>MV D |
| Old Notes: | | | Notes: | | | | |
| ANNABEL DAOUPISS... - 2.2*<br>Democrat - Female, 38 | 1 W 85TH ST<br>Apt 7A | | 1 2 3<br>4 5 | GW+ TJ+ TR+<br>GW- TJ- TR- | AH C HC<br>PT QL O | | NH DNC<br>MV D |
| Old Notes: | | | Notes: | | | | |
| REBECCA B NEARY - 1.1<br>Democrat - Female, 40 | 1 W 85TH ST<br>Apt 7A | | 1 2 3<br>4 5 | GW+ TJ+ TR+<br>GW- TJ- TR- | AH C HC<br>PT QL O | | NH DNC<br>MV D |
| Old Notes: | | | Notes: | | | | |

Rating Codes:
1 - Strong Support
2 - Lean Support
3 - Undecided
4 - Lean Oppose
5 - Strong Oppose Opponent Codes:
GW - George Washington
TJ - Thomas Jefferson
TR - Theodore Roosevelt Issue Codes:
AH - Affordable Housing
C - Crime
HC - Healthcare
PT - Property Taxes
QL - Quality of Life O - Other Result Codes:
NH - Not Home
DNC - Do Not Call
MV - Moved
D - Deceased Data by:
Prime NY Powered by:
Lincoln Voters™

Fig. 33

My Targets / Full HH / Manhattan / 69 AD / 1 ED

Page: 1

Back to Voter List

SARA TRACHTENBERG
251 CENTRAL PARK W, APT 7B
NEW YORK, NY 10024

SHAYNE BERNSTEIN
257 CENTRAL PARK W, APT 7G
NEW YORK, NY 10024

DOUGLAS MARKEL
257 CENTRAL PARK W, APT 2G
NEW YORK, NY 10024

ANNABEL DAOUPISSARRO
1 W 85TH ST, APT 7A
NEW YORK, NY 10024

DANIEL ABRAM
1 W 85TH ST, APT 5D
NEW YORK, NY 10024

ELLIOT ZWEIG
1 W 85TH ST, APT 3C
NEW YORK, NY 10024

PABLO PICAYO
19 W 85TH ST, APT A
NEW YORK, NY 10024

GRISELDA JIMENEZ
19 W 85TH ST, APT B
NEW YORK, NY 10024

STEPHEN MCNAMEE
23 W 85TH ST, APT 5B
NEW YORK, NY 10024

MATTHEW LEISH
25 W 85TH ST, APT 5B
NEW YORK, NY 10024

IRWIN ROSENFELD
33 W 85TH ST, APT 4B
NEW YORK, NY 10024

MELISSA BROWN
39 W 85TH ST, APT 5B
NEW YORK, NY 10024

JEFFREY FLETCHER
47 W 85TH ST, APT A
NEW YORK, NY 10024

ABIGAIL STRUBEL
49 W 85TH ST, APT 3R
NEW YORK, NY 10024

MONICA HOPENWASSER
49 W 85TH ST, APT 2D
NEW YORK, NY 10024

ALISON MACGREGOR
65 W 85TH ST, APT 4A
NEW YORK, NY 10024

JANE DESNOYERS
65 W 85TH ST, APT 3A
NEW YORK, NY 10024

MARK PYLE
65 W 85TH ST, APT 1B
NEW YORK, NY 10024

ANDREW PELS
71 W 85TH ST, APT 5C
NEW YORK, NY 10024

JULIE HOWE
71 W 85TH ST, APT 4C
NEW YORK, NY 10024

NICOLE PORAT
75 W 85TH ST, APT 1A
NEW YORK, NY 10024

GERALD ADAMSKI
8 W 86TH ST, APT 4B
NEW YORK, NY 10024

RACHEL ZWEIGHAFT
8 W 86TH ST, APT PVT
NEW YORK, NY 10024

DAISY KLINGMAN
10 W 86TH ST, APT 14A
NEW YORK, NY 10024

Fig. 34

SCOTT JEFFREY Reports

Main Menu | Voter Lists | Walk/Call Sheet | Mailing Labels | Excel Export | Reports | Voter Search | Log Out | Help Addl. Reports | Precincts: Manhattan | 69 AD (63844, 5736) | All EDs
My Targets | All Phones | All Affiliations | All Genders | All Ages | All Parties | All Buildings | All Districts | All ZIPs | Clear
☑ Full Households | All Supports | All Opponents | All Issues | All Activities | All Petitions | All Contacts | Filter Top 20 NYC Poll Sites by Targets

Top 20 NYC Poll Sites by Targets

| | My Targets | Non-Target Voters | My Voters |
|---|---|---|---|
| 234 WEST 109 STREET at PS 165 | 680 | 6080 | 6760 |
| 163 WEST 97 STREET at PS 163 | 612 | 7278 | 7890 |
| 150 WEST 105 STREET at PS 145 | 368 | 2715 | 3083 |
| 140 WEST 102 STREET at WESTSIDE HIGH SCHOOL | 367 | 5174 | 5541 |
| 125 WEST 109 STREET at UTACPT | 238 | 2066 | 2304 |
| 230 WEST 103 STREET at MARSEILLES APTS | 227 | 2061 | 2288 |
| 593 COLUMBUS AVENUE at GODDARD RIVERSIDE | 223 | 2852 | 3075 |
| 32 WEST 92 STREET at PS 84 | 214 | 3496 | 3710 |
| 123 MORNINGSIDE DRIVE at PS 36 | 212 | 1251 | 1463 |
| 411 WEST 116 STREET at WEIN HALL | 204 | 1173 | 1377 |
| 154 WEST 93 STREET at PS 118 | 200 | 2631 | 2831 |
| 11 WEST 102 STREET at KURT & LEAH APTS | 190 | 1782 | 1972 |
| 735 WEA (H/A W 96 ST) at PS 75 | 183 | 1846 | 2029 |
| 2050 8 AVENUE at CHARLES HILL TOWER | 172 | 1688 | 1860 |
| 549 RIVERSIDE DR at COLUMBIA UNIV HOUSES | 160 | 790 | 950 |
| 3150 BROADWAY at GEN GRANT HOUSES | 115 | 966 | 1081 |
| 132 WEST 89 STREET at PS 166 | 112 | 1549 | 1661 |
| 601 WEST 113 STREET at FOREST CHAMBERS | 98 | 773 | 871 |
| 467 CENTRAL PARK WEST at 467 CENTRAL PARK W | 96 | 697 | 793 |
| 414 WEST 120 ST at COLUMBIA UNIV HOUSE | 95 | 415 | 510 |

Abraham Lincoln
Democrat for 69th Assembly District

Data By: Prime NY
Powered By: Lincoln Voters™

Fig. 35

SCOTT JEFFREY Build Walk

Main Menu | Build Walk | Last Logins | Best Friends | Send News | Log Out | Help

Starting Corner
County: Manhattan
Starting Street: AMSTERDAM AVE
Starting Corner: AMSTERDAM AVE and W 100TH ST (map)

Walk
Block 1: Walk W 100TH ST to BROADWAY (map)
Block 2: Walk BROADWAY to W 101ST ST (map)
Totals: 7 My Targets, 127 My Voters, 199 Registered Voters Select Walk Group:

New Walk Group:
Walk Name:

Save Walk

Next Corner

Walk BROADWAY to W 102ND ST
0 My Targets, 0 My Voters, 2 Registered Voters Walk W 101ST ST to W END AVE
9 My Targets, 175 My Voters, 245 Registered Voters Walk W 101ST ST to AMSTERDAM AVE
33 My Targets, 352 My Voters, 473 Registered Voters Next Step Prev. Step  Start Over Abraham Lincoln
Democrat for 69th Assembly District Data By: Prime, NY
Powered By: Lincoln Voters™

Fig. 36

| My Targets / Full HH / Manhattan / 69 AD / 1 ED | | | | | | |
|---|---|---|---|---|---|---|
| Voter ID | First Name | Last Name | Sex | Age | Address | Apt |
| 304931876 | SARA | TRACHTENBERG | F | 29 | 251 CENTRAL PARK W | 7B |
| N1070826 | MORTON | TRACHTENBERG | M | 72 | 251 CENTRAL PARK W | 7B |
| W1099171 | FAY | ROBIN | F | 63 | 251 CENTRAL PARK W | 7B |
| 304937674 | MELISSA | TRACHTENBERG | F | 29 | 251 CENTRAL PARK W | 7B |
| 304259621 | SHAYNE | BERNSTEIN | F | 36 | 257 CENTRAL PARK W | 7G |
| 305618484 | DOUGLAS | MARKEL | M | 30 | 257 CENTRAL PARK W | 2G |
| 304819793 | ANNABEL | DAOUPISSARRO | F | 38 | 1 W 85TH ST | 7A |
| 303345345 | REBECCA | NEARY | F | 40 | 1 W 85TH ST | 7A |
| 304386145 | DANIEL | ABRAM | M | 25 | 1 W 85TH ST | 5D |
| C0867981 | MICHAEL | ABRAM | M | 62 | 1 W 85TH ST | 5D |
| C0867983 | RACHEL | ABRAM | F | 59 | 1 W 85TH ST | 5D |
| 304335074 | ELLIOT | ZWEIG | M | 26 | 1 W 85TH ST | 3C |
| 303536118 | PENNY | OSTREICHER | F | 53 | 1 W 85TH ST | 3C |
| 304822177 | PABLO | PICAYO | M | 24 | 19 W 85TH ST | A |
| 304689956 | GRISELDA | JIMENEZ | F | 23 | 19 W 85TH ST | B |
| 305573288 | STEPHEN | MCNAMEE | M | 28 | 23 W 85TH ST | 5B |
| 303719975 | ELIZABETH | CONNORS | F | 33 | 23 W 85TH ST | 5B |
| 306139039 | KIRK | ZIEHM | M | 33 | 23 W 85TH ST | 5B |
| 303690264 | MATTHEW | LEISH | M | 37 | 25 W 85TH ST | 5B |
| 302843085 | IRWIN | ROSENFELD | M | 28 | 33 W 85TH ST | 4B |
| 304382461 | ADRIENNE | GLASSER | F | 28 | 33 W 85TH ST | 4B |
| 305265699 | MELISSA | BROWN | F | 27 | 39 W 85TH ST | 5B |
| 305726752 | SHANNON | MCCONN | F | 28 | 39 W 85TH ST | 5B |
| 305860344 | WARREN | RAND | M | 35 | 39 W 85TH ST | 5B |
| 306068222 | SHANNON | RAND | F | 28 | 39 W 85TH ST | 5B |
| 304584559 | JEFFREY | FLETCHER | M | 33 | 47 W 85TH ST | A |
| 304144171 | JENNIFER | READ | F | 33 | 47 W 85TH ST | A |
| 302940806 | ABIGAIL | STRUBEL | F | 36 | 49 W 85TH ST | 3R |
| 305544260 | MONICA | HOPENWASSER | F | 34 | 49 W 85TH ST | 2D |
| 304597230 | RYAN | WOODRING | M | 34 | 49 W 85TH ST | 2D |
| 304703611 | ALISON | MACGREGOR | F | 31 | 65 W 85TH ST | 4A |
| 304632832 | DARREN | GAFFNEY | F | 31 | 65 W 85TH ST | 4A |
| 304764575 | MARY | YOUNG | F | 31 | 65 W 85TH ST | 4A |
| 304589840 | JANE | DESNOYERS | F | 36 | 65 W 85TH ST | 3A |
| 305577056 | MARK | PYLE | M | 32 | 65 W 85TH ST | 1B |
| 304772358 | ANDREW | PELS | M | 27 | 71 W 85TH ST | 5C |
| 304477678 | JULIE | HOWE | F | 38 | 71 W 85TH ST | 4C |
| C0795189 | EDWARD | MATERIALE | M | 59 | 71 W 85TH ST | 4C |
| 304801626 | NICOLE | PORAT | F | 29 | 75 W 85TH ST | 1A |
| 306098629 | GERALD | SINGER | M | 62 | 75 W 85TH ST | 1A |
| 304386868 | GERALD | ADAMSKI | M | 35 | 8 W 86TH ST | 4B |
| 300968275 | RACHEL | ZWEIGHAFT | F | 34 | 8 W 86TH ST | PVT |
| 303143399 | DAISY | KLINGMAN | F | 32 | 10 W 86TH ST | 14A |
| M0257977 | BARRY | KLINGMAN | M | 63 | 10 W 86TH ST | 14A |
| M0259587 | ARLENE | KLINGMAN | F | 65 | 10 W 86TH ST | 14A |
| 301321149 | MARIA | RUVOLDT | F | 38 | 10 W 86TH ST | 7B |
| 301321151 | JASON | MALAMUD | M | 43 | 10 W 86TH ST | 7B |

Fig. 37

SCOTT JEFFREY Send Newsletter [TEST]

Main Menu    Last Logins    Best Friends    Send News    Log Out    Help

Legalize Votes (0 Subscribers)    Select Newsletter

From Name:    From E-Mail:    ☑ TEST

Send    Send to List

E-Mail Subject:

E-Mail Body:    Text is already HTML    Convert text to HTML

HTML Header:

Text Header:

HTML Footer:

Text Footer:

Fig. 38

SCOTT JEFFREY Last Logins [TEST]

Main Menu    Last Logins    Best Friends    Send News      Log Out    Help

Last Logins

| First | Last | ID | Email | Date |
|---|---|---|---|---|
| SCOTT | JEFFREY | 1 | scott@legalize.com | 2006-07-31 20:24:46 |
| RANDAL | JEFFREY | 1534 | rjeffrey@legalizevotes.com | 2006-06-05 09:30:31 |
| ANDREW | BRADNER | 8356 | bradnerandrew@yahoo.com | 2006-05-02 08:44:11 |
| ELENA | MORIN | 1520 | elenamorin@gmail.com | 2006-04-30 20:40:27 |
| ALEXIS | ROBIE | 1518 | avrobie@aol.com | 2006-04-28 15:20:21 |
| FIRSTNAME | LASTNAME | 8013 | broncofanatic69@yahoo.com | 2006-04-26 22:07:56 |
| HEATHER | KEMMERER | 1576 | ducttapeone@msn.com | 2006-04-25 14:39:55 |
| MASCHA | SCHN | 1519 | mascha00@hotmail.com | 2006-04-25 08:15:05 |
| ARIC | WILT | 3122 | aricnyc@nyc.rr.com | 2006-04-24 20:04:31 |
| DAVID | TORODE | 6743 | dbledave@aol.com | 2006-04-24 12:34:47 |
| CHARLES | IMOHIOSEN | 8353 | cimohiosen@hotmail.com | 2006-04-24 11:39:28 |
| SCOTT | SALA | 1559 | scott@slantpoint.com | 2006-04-23 21:37:35 |
| DANIEL | DROMM | 8352 | QLGPC@aol.com | 2006-04-23 20:01:03 |
| CR | LOSASSO | 8351 | mishonary69@yahoo.com | 2006-04-23 18:55:52 |
| JAMES | KLUM | 1587 | jk4514@yahoo.com | 2006-04-23 17:36:04 |
| MIRANDA | HALVERSON | 762 | mirandapearl@hotmail.com | 2006-04-23 16:04:05 |
| JOHN | MERCHANT | 8349 | john@johnmerchant.com | 2006-04-23 15:08:22 |
| JESSICA | BARTOLINI | 124 | jeggarose@yahoo.com | 2006-04-23 14:21:26 |
| CHRISTINA | HOUGH-WOOD | 1590 | asystole69@aol.com | 2006-04-19 20:56:26 |
| TEST | NEW | 1589 | testnew@votejeffrey.com | 2006-04-19 11:11:38 |
| KAMI | BONHAM | 1585 | chickensrgreat@hotmail.com | 2006-03-19 17:34:17 |
| BRAD | MCC | 1583 | toledodad442@yahoo.com | 2006-03-09 20:04:00 |
| ZACHARY | KRAMER | 1582 | SHAGGY420@SATX.RR.COM | 2006-02-25 12:53:18 |
| NATE | SIMMONS | 1581 | nate.simmons@gmail.com | 2006-02-20 15:02:14 |
| CHAD | SNOWBURG | 1580 | chad.snowburg@gmail.com | 2006-02-13 10:52:27 |
| CELEB | HOUND | 935 | celebhound@votejeffrey.com | 2006-02-08 17:50:44 |
| DAVID | EVANS | 623 | dave219@aol.com | 2006-02-01 11:58:15 |
| MATHEW | LEHR | 1571 | Matlehr@gmail.com | 2006-01-10 09:30:51 |
| PAVITRA | MEHTA | 1152 | piggee21@aol.com | 2006-01-08 16:46:30 |
| TOM | PENIFF | 1568 | devilinfested@aol.com | 2006-01-01 22:49:02 |
| MICHAEL | VASSAR | 1567 | michaelvassar@hotmail.com | 2005-12-29 11:02:49 |
| ELENA | BASQUES | 1566 | MOTOGURL311@HOTMAIL.COM | 2005-12-22 08:58:06 |
| SAGACE | SNEPHRUE | 1565 | sagace555@yahoo.com | 2005-12-18 17:46:13 |
| LYNN | FISCHER | 1564 | lynn@sorted-inc.com | 2005-12-09 13:56:29 |
| POONAM | KUMAR | 912 | poonamk@umich.edu | 2005-12-08 08:41:04 |
| ROBERT | COGGINS | 1563 | foreverdrkness@yahoo.com | 2005-12-05 17:58:35 |
| MARC | LANDIS | 1562 | marc@landis.org | 2005-12-03 08:34:56 |
| LAWRENCE | MOSS | 1561 | reform@moss-law.com | 2005-11-30 21:59:26 |
| JACQUELINE | TORRES | 1457 | jtorres852@hotmail.com | 2005-11-09 07:07:19 |
| HEATHER | HATTON | 93 | acutewit@gmail.com | 2005-11-09 06:46:43 |
| MARINA | ZORN | 67 | marina.c.zorn@gmail.com | 2005-11-09 06:15:44 |
| GREGORY | DONOVAN | 1543 | mayoral05@gmail.com | 2005-11-08 19:02:00 |
| ALEXANDRA | MACWADE | 1551 | wretched.tiger@gmail.com | 2005-11-08 10:40:24 |
| KATHLEEN | MAHER | 279 | grasshopper@nyc.rr.com | 2005-11-08 05:38:11 |
| THOMAS | LOWENHAUPT | 1548 | toml@communisphere.com | 2005-11-06 11:09:42 |
| DANIEL | CHECK | 1547 | dan@jloreview.com | 2005-11-06 06:56:51 |
| MICHAEL | FRY | 1545 | adidasandmike_d@yahoo.com | 2005-11-04 14:07:47 |

Fig. 39

SCOTT JEFFREY Best Friends [TEST]

Main Menu     Last Logins     Best Friends     Send News        Log Out     Help

Best Friends

| First Name | Last Name | UserID | VoterID | Friends | E-Mails |
|---|---|---|---|---|---|
| SCOTT | JEFFREY | 1 | 304279249 | 256 | 3769 |
| ELENA | MORIN | 1520 | 304386701 | 42 | 27 |
| CELEB | HOUND | 935 | NOVOTE0626 | 17 | 1 |
| LIZA SABATER | TIRADO | 1507 | NOVOTE1019 | 10 | 0 |
| JESSICA | BARTOLINI | 124 | 304240825 | 9 | 9 |
| COLLEEN | FITZSIMONS | 1525 | 304867695 | 5 | 0 |
| QUINN | RAYMOND | 791 | 304736945 | 5 | 0 |
| DAMIEN | MANNING | 787 | 304879658 | 4 | 0 |
| CHRISTINA | KARKUTOWSKI | 1211 | 302718610 | 3 | 2 |
| DANIEL | CHECK | 1547 | 303650048 | 3 | 3 |
| JENNIFER | FAVORITE | 519 | NOVOTE0336 | 2 | 0 |
| EMILY | FARRIS | 932 | 305376670 | 2 | 0 |
| AMANDA | WALLWIN | 241 | 305570057 | 1 | 0 |
| TEST | NEW | 1589 | NOVOTE1069 | 1 | 0 |

Most Popular

| First Name | Last Name | UserID | VoterID | Friends | E-Mails |
|---|---|---|---|---|---|
| SCOTT | JEFFREY | 1 | 304279249 | 2 | 9 |
| SCOTT | SHEIDLOWER | 1386 | 304467220 | 1 | 24 |
| ABIGAIL | COOKMACK | 1530 | 304386708 | 1 | 1 |
| LYNN | FISCHER | 1564 | 303506124 | 1 | 24 |
| DAMIEN | MANNING | 787 | 304879658 | 1 | 25 |
| MELISSA | PETERSON | 1523 | 305776114 | 1 | 24 |
| DANIEL | CHECK | 1547 | 303650048 | 1 | 24 |
| ROY | DUNLAP | 8355 | 304555945 | 1 | 24 |
| CELEB | HOUND | 935 | NOVOTE0626 | 1 | 1 |
| GEORGE | MORIN | 1526 | M0320619 | 1 | 1 |
| WILLIAM | OREILLY | 1560 | 304844874 | 1 | 8 |
| RONALD | MOORE | 752 | N1013288 | 1 | 24 |
| GARY | PARKER | 1512 | 301823973 | 1 | 24 |
| CATHERINE | COLLINS | 1531 | N1116654 | 1 | 1 |
| EVE | GOODMAN | 8350 | 306151265 | 1 | 1 |
| QUINN | RAYMOND | 791 | 304736945 | 1 | 23 |
| MEREDITH | ELLIN | 1524 | 305955299 | 1 | 1 |
| THOMAS | LOWENHAUPT | 1548 | 301876906 | 1 | 22 |
| CHRISTINA | KARKUTOWSKI | 1211 | 302718610 | 1 | 23 |
| RANDI | PECK | 1529 | 303119567 | 1 | 24 |
| LAWRENCE | MOSS | 1561 | 302415686 | 1 | 25 |
| JORDAN | SCHWARTZ | 773 | 304291251 | 1 | 24 |
| ELANA | SHNEYER | 1522 | 305727580 | 1 | 1 |
| RANDAL | JEFFREY | 1534 | 303055629 | 1 | 23 |
| DANIEL | DROMM | 8352 | 301088278 | 1 | 25 |
| EMILY | FARRIS | 932 | 305376670 | 1 | 25 |
| COLLEEN | FITZSIMONS | 1525 | 304867695 | 1 | 1 |
| SCOTT | SALA | 1559 | 302944657 | 1 | 8 |

Fig. 40

METHOD AND APPARATUS FOR IMPLEMENTING A PERSONAL "GET OUT THE VOTE DRIVE" SOFTWARE APPLICATION

CROSS-REFERENCE TO RELATED APPLICATIONS

This application claims the benefit of U.S. application Ser. No. 11/891,534, filed Aug. 9, 2007, which claims the benefit of U.S. Provisional Application No. 60/836,712, filed on Aug. 10, 2006, the disclosures of each which are incorporated herein by reference.

FIELD OF THE INVENTION

The present invention is directed to providing a method and apparatus for campaign field operations in order to effectively identify likely voters and educate and motivate the general public to vote via a software applications tool, and more particularly, to a method and apparatus that makes public voter records available and allows for the general public to participate in a campaign's field operations via an Internet web site.

BACKGROUND OF THE INVENTION

Motivating citizens to vote and influencing their decision on who to vote for are critical parts of election campaigns, and "get out the vote" (or GOTV) technologies and techniques are used to motivate citizens to vote and to influence who they vote for.

There are currently two recognized categories of GOTV activity, that is: (i) Field Operations, which target likely voters, and (ii) GOTV Drives, which aim to educate and motivate the American public to vote. Each will be discussed in turn below:

(i) Field Operations: Field Operations are run by Campaigns and Organizations (such as political parties, labor unions, and grassroots organizations) with the purpose of Targeting Likely Voters. The first step of a field operation is to narrow the list of all voters to a smaller list of targets. The second step is to contact these targeted voters and "ID" them on level of support—who is a strong supporter, a lean supporter, an undecided, a lean against and a strong against. The third step is to communicate with the lean supports and the undecided via phone calls, targeted mailings, e-mails, and in-person door knocking to solidify their support (with the potential to bump up their IDed support). The final step occurs just before Election Day when all the strong and lean supports are contacted and reminded to go vote.

Selection of who should be targeted is critical to the success of a Field Operation. The primary factor is Voter History. For instance, a candidate running in the Democratic Primary would want to target Democrats that have voted in previous Primaries. Other secondary factors can come into play, such as demographics (a Korean candidate would want her targeting weighted in favor of fellow Koreans) and geography (a City Councilman running for Mayor would want his targeting weighted in favor of residents of his current district).

However, no method exists that provides a way of measuring voter history and assigning a number to it. Likewise, no method exists for characterizing and indexing the voting tendency of an entire household of voters, lists of voters, or clusters of voters.

(ii) GOTV Drives: The second category is what is commonly thought of as "get out the vote" (hereinafter "GOTV") drives, or GOTV Drives. These are typically run by non-partisan, non-profit organizations and are comprised of television, radio, and print ads, public service announcements, and voter registration drives with the aim to Educate and Motivate the American Public to Vote. An example of a GOTV Drive would be the "Rock the Vote" initiative aimed at youth.

The last few years have seen an explosion of online Internet and E-Mail political activity. Existing technologies and techniques have proved effective for both fundraising and activist mobilization (such as volunteer recruitment and hosting events). However, these existing technologies and techniques have been entirely ineffective in educating and motivating the American public to vote. An example of this is the Howard Dean Presidential Campaign of 2004.

In addition, there has not existed any system that allows for the general public to view voter records including voter history, even their own. Voter records are public records, which are available at local and state Board of Election offices and that also contain private information such as birthdates, phone numbers, and addresses, including apartment numbers. This private information has been a barrier to providing these records online (or even through analogue means) to the general public.

With "raw" voter records being unavailable to the general public, this has in turn prevented a derived characterization or summary of voting history being made available to the public. More broadly, with voter records being unavailable to the public, this has prevented the development of Personal GOTV Drive technologies that would allow a citizen to create a voter list of friends and family and take responsibility to ensure that they vote, including for endorsed candidates.

Finally, there have been no systems that integrate new Personal GOTV Drive systems with existing Field Operations systems. This has prevented campaigns and organizations from fully utilizing the power of Internet and E-Mail technologies in the field operations.

SUMMARY OF THE INVENTION

Accordingly, various embodiments disclose campaign management tools that may be specifically tailored to provide a Personal "Get Out The Vote Drive" software tool that interfaces with a Field Operations software tool and incorporates Voter Score, Voter Scorecard, Voter History Accountability after an Election, Household Visualization, Household Mailing Labels, E-Mail Voter Footer, and Voter List of Friends and Family (collectively referred to hereinafter as the "Lincoln Voters Invention").

The Lincoln Voters Invention may be sponsored by a Campaign or Organization. Staff and Volunteers use the Field Operations subsystem, the General Public uses the Personal GOTV Drive subsystem, and the Subsystem Interface allows the two groups to act both independently and in concert as the situation demands.

In a preferred embodiment, the present invention is implemented as a web-based software application with minor customizations specific to each client. The framework of these embodiments is as follows:

1. The Lincoln Voters Invention includes two parts and their interface. The three pieces are named: the Field Operations subsystem; the Personal GOTV Drive subsystem; and the Subsystem Interface.

2. The Personal GOTV Drive subsystem solves the puzzle of how to provide public voter records to the General Public without violating Personal Privacy.

3. The Subsystem Interface solves the puzzle of how to allow the General Public to participate in a Field Operations subsystem without violating personal privacy between the user and the Campaign or Organization. It also solves the puzzle of how to allow this participation without compromising confidential campaign information in the Field Operations subsystem.

4. The Lincoln Voters Invention in its entirety solves the puzzle of how to Educate and Motivate the American Public to Vote.

5. Three standalone embodiments that improve existing Field Operations tools are Post-Election Voter History, Household Visualization, and Household Mailing Labels. The Post-Election Voter History is also an improvement to existing GOTV tools.

6. Two standalone embodiments within the Lincoln Voters Invention include the summary Voter Score and detailed Voter Scorecard. These embodiments provide superior Field Operations tools, and are an entirely new method of Educating and Motivating the American Public to Vote.

7. Another standalone embodiment within the Lincoln Voters Invention is the E-Mail Voter Footer. This is entirely new to existing Field Operations tools, does not exist in any form for any purpose, and is an entirely new method of Educating and Motivating the American Public to Vote.

8. Another standalone embodiment within the Lincoln Voters Invention is the Voter List of Friends and Family. Similar tools already exist in existing Field Operations tools but not in a form appropriate for a Personal GOTV Drive tool. Thus it is an improvement to existing Field Operation tools and an entirely new method of Educating and Motivating the American Public to Vote.

9. The Personal GOTV Drive subsystem may be defined by combining the E-Mail Voter Footer and the Voter List of Friends and Family. This is what makes it unique from any existing GOTV tools and entirely new.

The following is an outline of certain parameters (for predicting, influencing, and scoring voters) of the Lincoln Voters Invention, which may be broadly broken up into the following aspects: I) Data ingestion and cleaning for voter score and householding; II) Creating, calculating, and updating voter score; III) Hiding aspects of voter data from the general public; IV) Creation of groups and networks of voters; V) Displaying voter score and voter data in various formats to various groups; VI) Combining voter score data with field operations data and other data, in both directions, and VII) Allowing general public to access campaign's field operation tool.

The first aspect, data ingestion and cleaning for voter score and householding, may include database creation and maintenance code with automated algorithms and manual procedures that correct and clean voter data. For example, in New York State alone, there are 58 distinct formats for Board of Elections data. Therefore, various embodiments provide for the standardizing data, such as streets with multiple names, and comparing ZIP codes, precinct numbers, and building numbers. Error checking and correction may also be performed, which can include counting voters per phone number, correcting city and town names, and merging voter histories into a single record based on the same birth date and similar name and/or address. Then, voting precincts are cleaned so that people aren't assigned to incorrect precincts. Additionally, a script may be provided to replace "No" votes with "N/A" votes based upon whether the individual had an opportunity to vote. Weightings for "N/A" scorings can be made so that there was an actual election, instead of noise, including changes over time.

The second aspect, creating, calculating, and updating voter scores, provides a quick and easy tag to classify voters based upon their voting histories. A voter may be ineligible to vote due to lack of a primary in a registered political party, or due to his or her age on the election date. Opportunities to vote distinguishes between those ineligible to vote vs. those who are eligible but chooses not to vote. A voter score may be defined as the actual number of votes divided by the opportunities to vote, which creates a consistent rating. In some cases, a sliding timeframe of measurement allows the vote score to be updated over time. In some embodiments, a requirement of multiple votes in a party and precinct to qualify as a "primary" precinct can account for noise in the underlying data. Additionally, multiple vote requirement may be tuned to fit the noise level, including the number of party members in a precinct and length of time since election. Certain embodiments allow an administrator to provide input on districts to generate "primary" precincts. Various embodiments permit measuring the effectiveness of GOTV techniques or responsible individuals, including through the use of "control" groups. Also, when raw voter data gets updated, certain embodiment permit the option of keeping the old data active and de-duping records.

The third aspect, hiding personal information linked to voter score, is provided so that remaining data can be made available to the general public. For example, voters' house number and apartment are hidden. Certain relations between records may also be hidden, such as who lives with a particular voter or everyone who lives in a particular building. Enhanced privacy may be provided to prevent the general area where a voter lives from being known, for instance hiding their poll site location. Some searches may be forbidden that could indirectly reveal hidden personal information. Other indirect means of ascertaining private voter information may also be forbidden, such as calculating the displayed age of a voter based upon the first of the month, so that if, for example, today the age of the voter were to go up by one year from yesterday, such a query would not reveal that today is that voter's birthday.

The fourth aspect, creation of groups and networks of voters, provides broad organizational relations management tools. Identity verification may be performed prior to linking a user to their voter record. Campaign field operations may inject outside-in membership data to create top-down groups. Individuals can create inside-out membership data to create grassroots efforts. Citizens may be permitted to track information about friends and family to improve their GOTV efforts directed at them. Information about a citizen's friends and family may be hidden from the campaign's field operations team. Various embodiments are able to create "non-voters" in the system, so that a user can put himself or herself in the system or put email lists of non-voters in the system. A non-voter record may be subsequently be linked with a voter record, which then purges the "non-voter" status. Certain embodiments provide for the automatic creation of a non-voter record when a user registers. Certain embodiments allow mutual friends to see each others' email addresses. A non-voter record in a household may also be created. Many embodiments provide the ability to send email using voter lists, including anonymous (both sender and receiver) emails. Some embodiments provide for the blocking of email, rather than unsubscribing, so that emails can't be forwarded to a user (for example, blocking the email from a particular user rather than from a group or organization). A unique ID for voter ID and communication purposes may be created so that hackers cannot access same link (and thus block communications from users other than himself or herself). Certain embodiments provide for selective blocking of emails, so that a first user is permitted to block emails from a second user but not from a third, or may block emails from both the second and third users but not the system.

The fifth aspect is displaying Voter Score information, and provides for the displaying of the voter score to the general public, to the user, or to friends and family of users in an E-Mail footer. Voter scores of groups and lists may also be displayed, as well as pledged votes vs. actual votes. Campaign staff and volunteers may be provided such scores, including visualization details such as color coding.

The sixth aspect provides combining voter score information with campaign field operations data. This may be used to influence individuals who are part of a household. Voter data and other linked data may be used to better identify who constitutes each household, and in the selection of who in a household a letter should be addressed to. Such decisions may depend on voter data and other linked data. Various embodiments thus provide for the identification, selection or both of the voting members within a household. Moreover, specific embodiments provide for the identification, selection or both of the influential members within a household, as well as the members interested in a particular message. This assists to saves costs, and reduces multiple mailings to the same household. This also helps to ensure that the desired member or members within a household open and read the mailing. Various embodiments thus permit campaign field operations to influence who to target and to organically influence the other members of the household. Specific embodiments may include additional data from sources other than voter data, such as adding confidential data from previous campaigns, adding confidential data from polling and/or focus groups, and adding proxy data inferred from other sources. For example, households having only two men over the age of 40 living together with different last names may be more likely to be a gay couple.

Finally, the seventh aspect allows the general public controlled access to a campaign's field operation tools. Campaign field operations data added by the campaign about voters may be hidden. Information entered by the general public about their friends and family may also be hidden. A "Friend ID" field may be used to help achieve privacy—if the field is blank then everyone can see the related item, while if it has a value then only that voter or user can see it. A "Voter Information Password" may also be used to help achieve privacy, and may be employed to verify that a user is the voter he or she claims to be; for example, the user may be required to enter the middle initial, birth month and year, and building number of the voter.

The present invention, including its features and advantages, will become more apparent from the following detailed description with reference to the accompanying drawings.

BRIEF DESCRIPTION OF THE DRAWINGS

FIG. 1 is an embodiment voter scorecard, in which a voter score with a quick summary is displayed in the top right portion of the scorecard.

FIG. 2 is an embodiment household visualization.

FIG. 3 is a detailed view of a portion of the household visualization depicted in FIG. 2.

FIG. 4 is an embodiment e-mail voter footer.

FIG. 7 shows an embodiment user registration screen, voter record confirmation.

FIG. 8 shows an embodiment screen that permits a member to edit their account information.

FIG. 10 shows an embodiment screen that permits a member to search voter records for friends and family.

FIG. 12 shows an embodiment list of the friends and family members as created by a member and presented by the system.

FIG. 14 shows an embodiment screen that permits a member to enter profile information about a voter in the list of friends and family.

FIGS. 19-20 shows an embodiment automatic demographic, geographic or political analysis of an organization's membership list.

FIGS. 21-23 present an example screen shot of such a pledge report.

FIG. 25 is a screen shot of an embodiment household display for field operations.

FIG. 26 shows an embodiment filed operations display that permits field operations staff to update voter information.

FIG. 27 shows an embodiment screen that permits an organization to internally manage personnel.

FIG. 28 shows an embodiment screen that permits field organization personnel to edit the political profile of a voter as determined by the organization.

FIG. 29 shows an embodiment field operations contact history page for a voter.

FIG. 30 shows an embodiment screen that permits field operation staff to build their own Friends and Family list.

FIG. 31 shows an embodiment screen that permits field operation staff to enter profile information about a Friend that is kept private from the organization's official identification of that voter.

FIG. 32 shows an embodiment screen for performing a fuzzy logic search for field operations staff to locate voter records.

FIG. 33 shows an embodiment walk sheet.

FIG. 34 shows an embodiment mailing label sheet.

FIG. 35 shows an embodiment report.

FIG. 36 shows an embodiment walk.

FIG. 37 illustrates the exporting of database information to a spreadsheet format.

FIG. 38 shows an embodiment screen for performing an e-mail blast.

FIG. 39 shows an embodiment listings of last logins to the system.

FIG. 40 shows an embodiment aggregate summary of all members' Friends and Family list.

DETAILED DESCRIPTION OF THE INVENTION

Figures 1, 2:
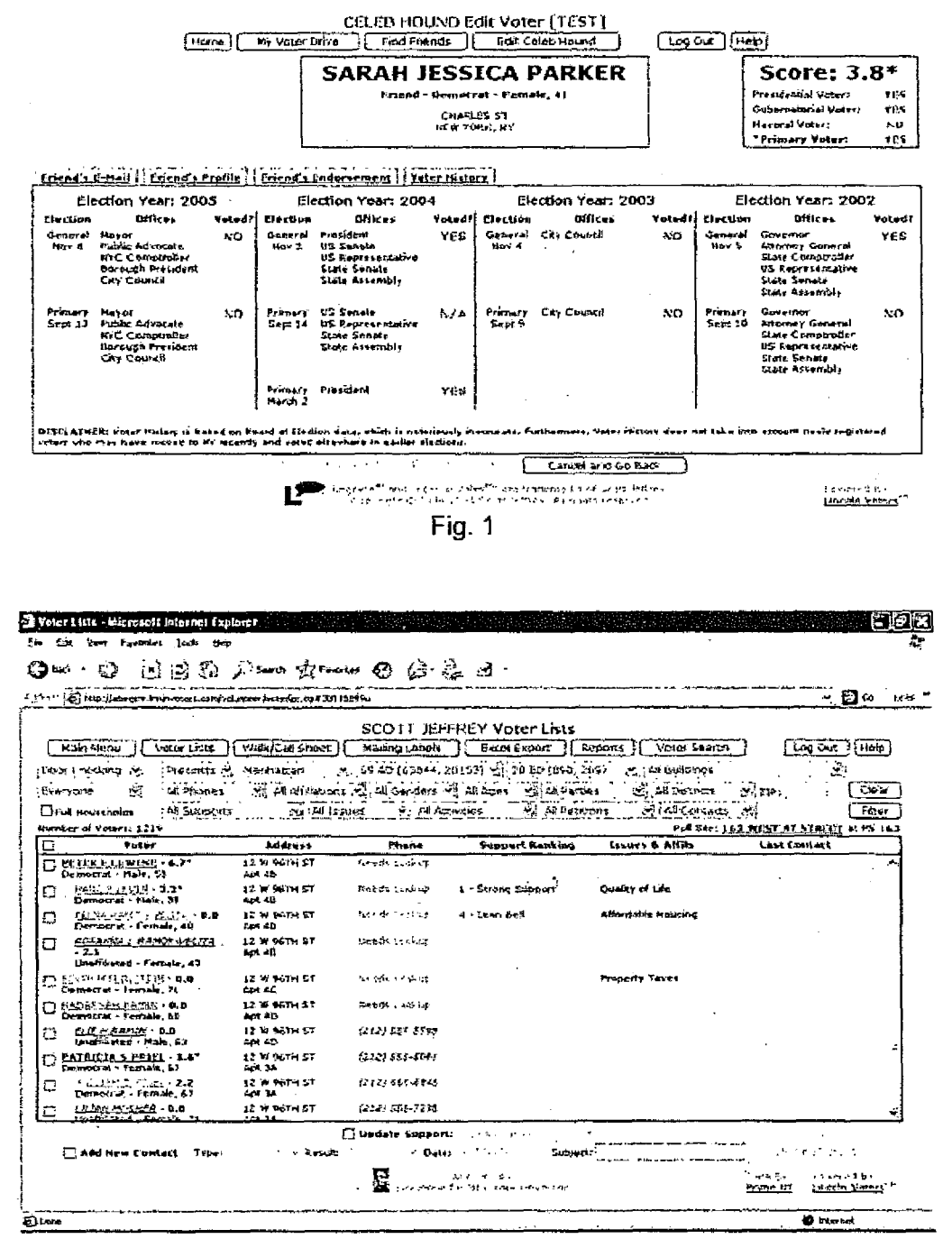
Figure 5:
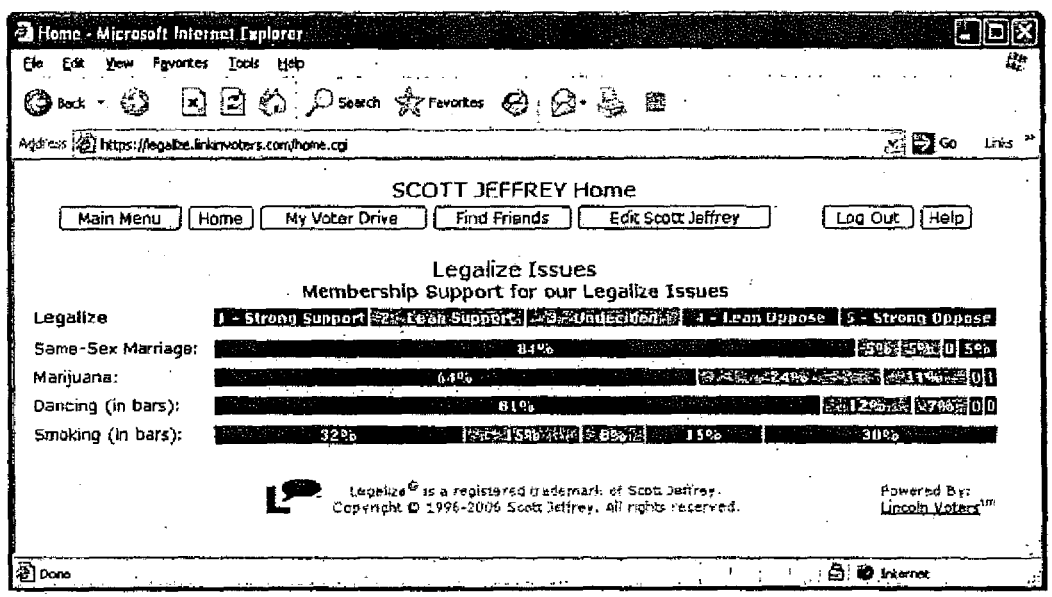
FIG. 5 is an embodiment voter support visualization.

FIGS. 1 through 5 and additional screen shots illustrate a method and related apparatus, which may be implemented as a software application that interfaces with a campaign's field operations and allows for voter education, motivation and getting voters out to vote.

A preferred embodiment will be explained first by detailing the computer hardware and software.

Server

In one embodiment of the present invention, users communicate with a central server through the use of user terminals via the Internet. Such communications could be continuous or on a batch basis.

The central server comprises a processor, memory (such as RAM or a hard disk), a communications port (capable of communicating with one or more user terminals), an input/output device (such as a keyboard or display screen), and software configured to perform an embodiment method. Exemplary servers include a 2.4 GHz Xeon processor with 512M of RAM and an 80 GB hard disk running Red Hat Enterprise Linux v.2.1.

Some or all of the server functions including, but not limited to database management and delivery functions could be held, locally onsite, or outsourced to a hosting company such as HostGator, DreamHost, WebXess or Yahoo Hosting.

Note that the central server does not necessarily need to store the database onsite. It may also access the databases which may be in remote locations. The central server may also store a history and transaction database about the various users.

User Terminal

In one embodiment, user terminals comprise a personal computer with a processor, memory (such as RAM or a hard disk), a communications port (capable of communicating with the central server), an input/output device (such as a keyboard or display screen), and software configured to perform an embodiment method, interface with the central server or both. Exemplary user terminals include a Sony VAIO with an 866 MHz processor, 128M of RAM and an 80 GB hard disk, running Windows 2000 with Internet Explorer installed.

Database

The central server hosts a database of voter information. Hundreds of fields of information and categorization are possible. The National Political Database, a top-level consolidated partial source from VCS provides 300 different demographic breakdowns of only some of the data. In one embodiment of the invention, the database might include the following types of information: Voter Name, including First Name, Last Name, Middle Initial and Suffix; Voter Party Registration; Voter Registration Date; Voter Birth date; Voter Gender; Voter Physical Address; Voter Mailing Address; Voter Phone Number; Voter E-Mail Address; Voter History; Voter Support for Candidates or Issues; Voter Motivating Issues; Voter Affiliations; Voter Pledges to Vote; Voter Petition Signature Status; General Notes on Voter; User Lists of Friends and Family; User Contacts with Voter; and Voter Score (which is an aspect unique to the instant invention).

Note that this is merely representative of the data types that could be included. Actual databases could contain hundreds of fields.

Server Application Code

The central server hosts server application code that, when executed, retrieves information from and writes information to the database, and reads information from custom configuration files. The application code is designed to perform the various steps described in the following. The computer application code is executed when a user interacts with the user terminal, which transmits requests to the server, and in turn receives a response with both data and client application code. The server application code can also initiate other actions, such as sending electronic e-mail or access a backup database. Any suitable programming language may be used to create the application code, the coding of which should be well within the means of one of reasonable skill in the art after having the benefits of the instant disclosure and related figures.

Client Application Code

The central server sends client application code to the user terminal that the user terminal then executes. This code allows for dynamic display, input, and manipulation of data.

Database Creation, Update, and Maintenance Code

The central server hosts additional server application code that may only be accessed by the administrator to create, update and maintain the data in the database.

Original "raw" data comes from multiple sources, for instance the county Board of Elections or commercial data vendors. This data also comes in various formats. In New York State alone there are 58 distinct formats for Board of Elections data.

In order for certain embodiments to perform efficiently and accurately, all the data is preferably standardized to a single format.

In addition, raw data contains errors and omissions. In order for various embodiments to perform efficiently and accurately, these errors should be detected and corrected.

In general, there are four types of data checks that are made:

1. Internal Inconsistencies. For example, twenty voters have the same house number, street and city (i.e., the same building) but eighteen have one ZIP code and the remaining two have a different ZIP code.

2. External Inconsistencies. For example, when voter data is joined with block-by-block mapping data, the street name "Eight Avenue" in the voter data doesn't match any street in the mapping data. This provides an alert that an error exists, and in this case the street name should be "Eighth Avenue".

3. Anomalies. This occurs when there are very few voters that share a characteristic. For example, there might be only a single voter listed as living in the city of "Utica" in Westchester County. This provides an alert that an error exists, and in the case Utica is not a city in Westchester County.

4. Patterns. For example, buildings on "Sixth Avenue" may share all other characteristics (like ZIP code and precinct) with buildings on "Avenue of the Americas". This alerts that an error exists, and in this case that these are two names are for the same street and must be combined into one.

In one embodiment, database creation code is provided with automated algorithms and manual procedures that correct and clean voter information. One example of how, in the current embodiment, voter data is cleaned and corrected is exemplified below:

The system identifies: 300 voters On Sea View Avenue, and 12 voters on Seaview Avenue. The system recognizes that the Board of Elections data may be in error. The system thus corrects all voters in the database to Sea View Avenue, the proper address.

Another example of database creation code with automated algorithms and manual procedures can be seen in how, in the current embodiment, the system may resolve changing geographical names and streets with multiple names. For example, Avenue of the Americas is the same street as Sixth Avenue, and a portion of Lenox Avenue has been renamed to Malcolm X Boulevard.

In one embodiment the system uses clustering to correct the data by looking for buildings on different streets that have the same Precincts and ZIP codes. For example: 100 Sixth Ave.=100 Ave. of Americas=30-13 Precinct=10035 ZIP; 120 Sixth Ave.=120 Ave. of Americas=30-13 Precinct=10035 ZIP; 125 Sixth Ave.=125 Ave. of Americas=30-16 Precinct=10035 ZIP; 135 Sixth Ave.=135 Ave. of Americas=30-17 Precinct=10036 ZIP.

If all the buildings on two different streets match both precinct and ZIP codes, there is a good chance that the two street names are actually the same street. Precincts are smaller units than ZIP codes and are specific to voter data.

Various embodiments make use of the precinct information to correct mistakes in the voter data as provided by, for example, the BOE. Because precincts are much smaller than ZIP codes, they provide what may be thought of as a second address. Using this precinct information, a voter file may be "cleaned." A pattern-recognition algorithm may be used to generate such cleaned data. By way of example, consider the following information obtained from the voter information:

"PP"—the percent of those common buildings that have been assigned to the same precinct; "ZP"—the percent of those common buildings that have the same ZIP code; "HP1"—the percent of those common buildings compared to the total number on the first street; "HP2"—the percent of those common buildings compared to the total number on the second street; "M1"—whether the first street name matches a street name found in an external data source (such as Census Tiger/Line files of city blocks); and "M2"—whether the first street name matches a street name found in an external data source (such as Census Tiger/Line files of city blocks). All of this information can be extracted from voter records using known database programming techniques, and cross-referencing records against each other.

These measurements determine the possibility that two streets are in fact the same street. It should be understood that

TABLE 1

| City | Street1 | Street2 | HN | LN | PP | ZP | HP1 | HP2 | M1 | M2 |
|---|---|---|---|---|---|---|---|---|---|---|
| NEW YORK | 1ST AVE | UNITED NATIONS PLAZA | 4 | 100 | 100 | 100 | 1 | 31 | 1 | 0 |
| NEW YORK | 6TH AVE | AVENUE OF THE AMERICAS | 54 | 11 | 100 | 98 | 39 | 84 | 0 | 1 |
| NEW YORK | 7TH AVE | ADAM C POWELL BLVD | 48 | 23 | 83 | 100 | 15 | 94 | 1 | 1 |
| NEW YORK | 7TH AVE | FASHION AVE | 3 | 33 | 100 | 100 | 1 | 50 | 1 | 1 |
| NEW YORK | 8TH AVE | FREDERICK DOUGLASS BLVD | 85 | 27 | 84 | 100 | 20 | 87 | 1 | 0 |
| NEW YORK | ALBANY ST | RECTOR PL | 1 | 100 | 100 | 100 | 11 | 8 | 1 | 1 |
| NEW YORK | ANN ST | PACE PLAZA | 1 | 0 | 100 | 100 | 11 | 100 | 1 | 0 |
| NEW YORK | AUDUBON AVE | W 193RD ST | 3 | 33 | 100 | 100 | 3 | 25 | 1 | 1 |
| NEW YORK | BARUCH DR | BARUCH PL | 2 | 100 | 100 | 100 | 12 | 25 | 1 | 1 |
| NEW YORK | BATTERY PARK PLAZA | GOVERNORS ISLAND | 1 | 0 | 100 | 100 | 100 | 25 | 0 | 1 |
| NEW YORK | BATTERY PARK PLAZA | S END AVE | 1 | 0 | 100 | 100 | 100 | 5 | 0 | 1 |
| NEW YORK | BAXTER ST | BAYARD ST | 5 | 60 | 100 | 100 | 22 | 15 | 1 | 1 |
| NEW YORK | BAYARD ST | MULBERRY ST | 10 | 50 | 80 | 100 | 30 | 8 | 1 | 1 |
| NEW YORK | BIALYSTOKER PL | WILLETT ST | 3 | 33 | 100 | 100 | 75 | 100 | 1 | 0 |
| NEW YORK | BOGARDUS PL | ELLWOOD ST | 1 | 100 | 100 | 100 | 12 | 3 | 1 | 1 |
| NEW YORK | BOWERY | PELL ST | 6 | 17 | 83 | 83 | 4 | 25 | 1 | 1 |
| NEW YORK | CARMINE ST | LEROY ST | 9 | 11 | 100 | 100 | 22 | 28 | 1 | 1 |
| NEW YORK | CATHEDRAL PKWY | W 110TH ST | 22 | 68 | 100 | 100 | 69 | 42 | 1 | 1 |
| NEW YORK | CENTRAL PARK N | W 110TH ST | 13 | 23 | 100 | 100 | 100 | 25 | 1 | 1 |
| NEW YORK | CENTRAL PARK S | W 58TH ST | 5 | 40 | 100 | 100 | 23 | 11 | 1 | 1 |
| NEW YORK | COLONEL ROBERT MAGAW PL | MAGAW PL | 8 | 25 | 100 | 100 | 100 | 62 | 1 | 0 |
| NEW YORK | CONFUCIUS PLAZA | DIVISION ST | 2 | 100 | 100 | 100 | 50 | 6 | 0 | 1 |

In the above Table 1, the columns and related calculations are: "HN"—the total number of house numbers that are common to both streets; "LN"—the percent of those common buildings that have someone with the same last name in both; there may be no hard-and-fast cutoff where certain values definitely indicate the same street. Instead, values are determined so that combinations that match or exceed a minimum criteria are presented to the user for he or she to make a final determination. Numerous combinations of the above calculation results may be used to make such a determination.

For example, the following criteria returns a list with a 40% likelihood (in Manhattan) of being the same street without excluding any:

(PP>=75 OR (HN<=3 AND PP>=30)) AND (ZP>0 OR HN=1) AND (LN>0 OR HP1>=80 OR HP2>=80) AND (((ZP>=50 OR HN=1) AND ((Intot=1 AND HN=1) OR (Intot>=2 AND HN<20) OR (LN>=10 AND HN>=20) OR (LN>=5 AND HP1>=50 OR HP2>=50)))) OR M1=0 OR M2=0

Note that "Intot" in the above formula is the total number of common buildings that have someone with the same last name in both (similar to "LN" above, but just expressed differently). Note also that this sample algorithm does not require that all common buildings have the same precincts and/or ZIP codes—this is to allow for mistakes in the voter file.

In various embodiments, to clean the voter data the procedure is to check every street against every other street in a city and return those that match or exceed a minimum criteria, such as the one outlined above. In Staten Island for instance there are approximately 3000 streets, and so just under 10 million combinations may be checked and whittled down to a hundred or so possibilities for the administrator to decide on.

This pattern recognition procedure allows for matching streets without comparing the actual street names. For instance, "GREENE STREET" and "GREEN STREET" appear to be similar, and a software algorithm can be developed to compare the two names and return them if they are similar enough. The pattern recognition procedure, however, does not need to look at the street names at all in making a determination. Thus, "SIXTH AVE" can be matched to "AVENUE OF THE AMERICAS".

This pattern recognition procedure allows for the first time the detection of what is called in the industry "boutique" street names. It can also be applied for detecting run-of-the-mill misspellings as well. This technique is ideally used for voter files because it makes use of precinct information.

For the internal and external inconsistencies mentioned above, any suitable known technique used to find errors may be used. For instance, the algorithm may search for streets of the same type ("Place", "Street", "Ave.", etc.) that have the same first five characters; thus, "GREENE STREET" and "GREEN STREET" may be suggested as possible misspellings.

However, precinct information may also be used for an additional level of checking. Each street has a set of precincts determined by all the precincts assigned to the buildings on that street. If the set of precincts are the same for two streets, or if one is a subset of the other, then this condition may be termed "PreSafe". If there is at least one common precinct in the two sets (but with each set having a precinct not found in the other), this condition may be termed "PreOverlap". Both "PreSafe" and "PreOverlap" street comparisons are likely to be the same street, whereas streets with no precincts in common at all are very unlikely to be the same. Note that two streets can be "PreSafe" without sharing any common house numbers.

Hence, this precinct information in combination with last name and ZIP code matches for common house numbers may be used to determine the chances that two streets are the same. "PreSafe" and "PreOverlap" could be further analyzed with percentages of matching precincts, but in practice it may be sufficient to present this information to the user since such corrections typically deal with name misspellings and in the end the street names themselves may be the determining factor.

Another embodiment can correct and clean precinct and ZIP Codes by locating voters with the same house number, street and city but different precincts or ZIP codes, and automatically correcting the precincts or ZIP codes that have fewer voters with the one with the most.

Another embodiment can correct and clean apartment numbers by locating voters with the same address and phone number but different apartment numbers. A manual process can then determine which is the correct apartment number and fix the incorrect one.

Another embodiment can correct and clean phone numbers by counting the number of voters per phone number. Phone numbers assigned to too many voters (for example, over ten) are likely incorrect and can be either automatically or manually deleted.

Another embodiment can correct and clean cities and towns. A list of cities and towns can be generated with total counts of voters in each. Those cities and towns with too few voters (for example, less than 20) can be identified and renamed either automatically or manually. A similar process can be done for streets.

Another embodiment can merge two voter records, including their voter histories, into a single record. Often, when a voter changes their registration, either the voter fills out the form incorrectly or the Board of Election mishandles the change. This results in two (or more) voter records created for the same person.

Voters having multiple voter records may be identified by comparing voters having: 1) the same birth date, 2) similar (but not necessarily identical) names and addresses, and 3) non-overlapping voter histories (for example, the latest "Yes" vote in one record comes before the first "Yes" vote in the other record). The invention can determine two records to be the same voter and merge them. For instance, Mary Smith and Mary Jones may have the same birth date and live in the same building and neither has ever voted. This is likely the same woman who changed her last name when she got married. This may be combined to create a single voter record (which may be the one having the latest registration date).

Voter Score

The voter score is a new method of summarizing voter histories into a single number with qualifying symbols that is easy to understand. A voter score is most often applied to a single voter, but can also be calculated and applied to lists and clusters of voters. The voter score may be calculated as a function of the number of times a voter has voted and the number of opportunities that voter has had to vote; for example, as the ratio of these two numbers. The voter score may be calculated across the entire voting history of the voter, or may be calculated across only a predetermined portion of the total history; for example, the voter score may be based upon the most recent four year's worth of voter data. Of course, other formulas may be used to generate other types of voter scores, or voter scores with different ranges. In preferred embodiments, however, the voter score has a value of 0.0 if the voter has never voted within the last four years, and a value of 10.0 if the voter has a perfect voting record (i.e., has voted at every opportunity within the last four years); score between these two extreme points are proportional to the number of times the voted (that is, each election is accorded the same weight).

In one embodiment, the voter score takes into account that often a voter is ineligible to vote in a primary or special election. This may employ sophisticated algorithms and is a new aspect independent of calculating the voter score.

In one embodiment, the voter score takes into account that young voters are ineligible to vote in any election before they turn 18 years of age. This may also employ sophisticated algorithms and is a new aspect independent of calculating the voter score.

In one embodiment, the voter score takes into account that newly registered voters are ineligible to vote in any election before they registered.

The voter score is an important aspect of the various embodiments, as prior to the invention no such consolidated score for voting had existed. Assembling a voter score is time consuming, barrier-prone and error-prone because voter data comes from different and inconsistent sources. Participation measures may be inconsistent, multiple overlapping precincts (clusters of registered voters) may be involved, similar names may be confused and misspellings abound in name and address information.

The various embodiments solve the above puzzles by providing a reliable and audited voter score.

The voter score is also useful overall in aspects that are designed to educate and motivate Americans to vote.

The voter score is an improvement over voter history displays in existing field operations tools that only track and display whether an individual has voted in specific elections and do not provide a single summary rating of the voter.

In one embodiment, the voter score summarizes lists and clusters of voters. This is a new aspect for both field operations and GOTV tools.

In one embodiment, voter score clustering can be used to support embodiments tailored towards post-election voter histories, which is an improvement to existing field operations tools.

In one embodiment, the voter score is used as an important element for embodiments tailored towards household visualization and household mailing labels, both of which are improvements to existing field operations tools.

In one embodiment, the voter score is used as an important element within embodiments directed towards e-mail voter footers, also a new aspect.

In one embodiment, the voter score is provided to the general public as an important element within an embodiment personal GOTV drive subsystem.

In one embodiment, the voter score is used as an important element within embodiments directed towards voter lists of friends and family, which is a new aspect as applied to GOTV tools.

In one embodiment, the voter score is displayed electronically, either on a website or in an e-mail. In an alternate embodiment, the voter score is displayed on printed paper or provided verbally to the general public.

Voter Score Number and Qualifying Symbol

In one embodiment, the voter score is a number ranging from 0.0 to 10.0 that summarizes the recent voter history and rates voters on a uniform scale. In addition, a qualifying symbol may be appended when appropriate, such as an asterisk, to indicate a special feature of interest, such as that the voter has participated in at least one recent primary election.

In one embodiment, the voter score is calculated by taking the number of times a person voted in the last four years and dividing that by the number of opportunities he or she had to vote during that same time period, multiplying the fractional result by 10 and rounding to the first decimal point. Additionally, the voter score includes an asterisk or the like if the voter has voted in at least one primary or special election in the last four years.

In other embodiments, a voter score may be attached to a cluster of voters. In certain preferred embodiments, the voter score for a cluster of voters is simply the average of the voter scores of everyone in the cluster; this weights all voters equally. For example, a cluster may have two voters: a Democrat who voted three times out of six opportunities to vote in the last four years (with an individual voter score of 5.0) and an non-affiliated (colloquially, independent) who voted three times but with only three opportunities to vote in the last four years (with an individual voter score of 10.0). The preferred embodiment would add 5.0 to 10.0 and divide by two to average them to a 7.5. Alternate embodiments may add up all the times every voter in the cluster voted and divide this value by all the opportunities every voter had to vote. Thus, in the prior example, 6 votes divided by 9 opportunities results in a 6.7 voter score for the cluster.

Voter Score Accounting for Ineligibility to Vote in Primaries and Special Elections Another novel aspect is the recognition that there is often no opportunity to vote in Primaries and Special Elections. This provides for a more accurate voter score, but is another embodiment in-and-of itself.

The current solutions in the industry treat such non-opportunities as negative participation. The current embodiment treats a non-opportunity to vote as a neutral or N/A for "not applicable." N/A votes may be omitted from voter score calculations.

Occasions where current industry solutions claim negative participation include, but are not limited to: No Primary in the voter's political party; no special election in the voter's districts (i.e. House, State Senate, etc.); the voter has registered unaffiliated with any political party (colloquially, registered as an independent) and thus cannot vote in any primary election.

There are over 16,000 precincts and five official "primary" parties in New York State alone.

In order to distinguish between negative participation (non-voting) versus N/A (no voting opportunity), various embodiments analyze every voter of the party within each precinct using proprietary software algorithms, which are discussed in the following. The number of votes in a precinct for everyone registered in a particular political party is calculated. If two or more votes were cast, then there was a primary in that precinct. Multiple votes are required due to errors in the Board of Election (BOE) data, and because there exist ambiguities in some BOE data formats (for instance, there may be no information on changes in party registration or residence, and hence ambiguity as to what party a voter was actually affiliated with when the vote was cast). The system then automatically updates the voter history by party and precinct, changing "NO" votes to "N/A" votes where appropriate.

An alternate embodiment requires more than two votes. Another alternate embodiment sets the minimum number of votes based on the total number of party members in that precinct. Another alternate embodiment increases the minimum number of votes the further back the election was, taking into account that "noise" (errors) grows over time as more people have moved or changed party affiliation.

An alternate embodiment presents all districts (House, State Senate, State Assembly, City Council, etc.) on screen and allows an administrator to manually check off which districts had a primary in that party or a special election. The administrator then clicks Save and the system automatically updates the voter history by party and precinct, changing "NO" votes to "N/A" votes where appropriate.

Adjusting the voter history itself to include N/A rather than "NO" votes is a new aspect separate from calculating the voter score. This aspect allows for more accurate measurement of voter participation and so offers an improvement over existing systems.

Once these adjustments are made to the voter history, a more accurate voter score can be calculated.

Voter Score Accounting for Ineligibility to Vote Due to Age

Another novel aspect is the recognition that young voters are not eligible to vote at all in past elections before they turn 18 years of age. This provides for a more accurate voter score, but is an embodiment in-and-of itself.

The current solutions in the industry treat such opportunities as negative participation, i.e., as "NO" votes. Various embodiments instead treat a non-opportunity to vote as a neutral or N/A vote.

In order to distinguish between negative participation (non-voting) versus N/A (no voting opportunity), various embodiments analyze each voter's birth date (as provided by BOE data) and compares it to the dates that the general, primary or special election was held (as either provided by BOE data, as hard-coded into the algorithm, or as provided by another source, such as an administrator or another database). The system automatically updates the voter history, changing "NO" votes to "N/A" votes where the voter's 18th birthday comes after the election date.

Adjusting the voter history to include N/A votes is an embodiment separate from the voter score. This embodiment allows for more accurate measurement of voter participation and is an improvement on existing systems.

Once these adjustments are made to the voter history, a more accurate voter score can be calculated.

Voter Score Accounting for Ineligibility to Vote Due to Recent Registration to Vote Certain embodiments of the voter score does not excuse those who recently registered to vote, but an alternate embodiment geared towards targeting likely voters might. This provides for a more useful voter score, but is also embodiment in-and-of itself.

The current solution in the industry is to treat such opportunities as negative participation. An alternate embodiment treats this non-opportunity to vote as a neutral or N/A vote.

In order to distinguish between negative participation (non-voting) versus N/A (no voting opportunity) the invention analyzes every voter's registration date (as provided by the BOE data) and compares it to the dates that the general, primary or special election was held (as either provided by BOE data, as hard-coded into the algorithm or as provided by another source, such as an administrator of the system or another database). The system automatically updates the voter history, changing "NO" votes to "N/A" votes where the voter's registration date is later than the election date.

Adjusting the voter history to include N/A votes is an embodiment separate from voter score. This invention allows for more useful targeting of likely voters and is an improvement on existing systems.

Once these adjustments are made to the voter history, a more useful voter score can be calculated.

It should be noted that the concept of a voter score is significantly diminished without the inclusion of N/A votes. Consider, for example, a precinct that has had three general elections in the past four years, with a Democratic primary last year and a Republican primary two years ago. Without N/A's, the best a voter could do in that precinct is an 8.0, because he wouldn't have been able to vote in the other party's primary. Given that the voter has voted in all elections he or she possibly could, it makes little sense to assign an 8.0 (out of a possible 10.0) to a perfect voter.

Voter Score Solution to Educating and Motivating Americans to Vote

Voter history has traditionally been used by campaigns and organizations to target likely voters. For instance, a candidate running in the Democratic primary would want to generate a list of voters that participated in recent primaries. The overall invention provides voter history information to the general public as one tool to motivate themselves and their friends and family to get out to vote.

In one embodiment, the voter score is calculated against a sliding four-year window of voter activity that captures the American election cycle. Thus, the voter score is a "live number" similar to how a consumer credit rating is live in that it adjusts based on the activity of the voter over time, "forgiving" past failures to vote in favor of more recent activity. This makes it easier to raise your score, thus helping to encourage more voting. Also, a poor voter with a low score is encouraged to vote with the knowledge that he can raise his score to a perfect score (i.e., a 10.0) over time.

The sliding four-year time frame may be of minimal value when targeting likely voters, but may be important to educating and motivating Americans to vote.

Alternate embodiments that are geared towards targeting likely voters could use a different time frame, or cover all votes ever recorded.

In one embodiment, all elections are weighted equally. This inherently sends a political message that the Presidential vote is no more important than any other. For example, many New York City youth are registered to vote in the Midwest or Florida where they grew up. They don't switch their registration to New York because they erroneously believe that voting for President in a swing state is more important than ever voting for NYC mayor and city council, and NYS governor and legislature.

Weighting all elections equally is often inappropriate when targeting likely voters but may be important to educating and motivating Americans to vote.

Alternate embodiments that are geared towards targeting likely voters could vary the weighting of elections, for instance giving primaries twice the weight as general elections, or giving the corresponding election from four years ago a greater weight.

In one embodiment, an asterisk or other identifiable mark is appended if the voter has participated in at least one primary in the last four years. This draws attention to the importance of primary voting, something many youth voters are not eligible to do due to registering without party affiliation (as "independents").

Marking primary voters with an asterisk or the like may be of minimal value when targeting likely voters but may be important to educating and motivating Americans to vote.

Alternate embodiments that are geared towards targeting likely voters could use multiple asterisks or the like, with each mark indicating a primary vote (to capture what is commonly called in the industry "single primes", "double primes" and "triple primes"). Another alternate embodiment could keep the single asterisk but change the number of years back that are checked.

All of the alternate embodiments listed above could also be applied to the voter score for the purposes of educating and motivating the American public to vote, if experience shows that these alternate embodiments are more effective, or if clients specifically request them.

Voter Score Clustering

A voter score can be assigned to a list or clustering of voters. These clusters may be arranged by demographic, geography, registration, party affiliation or other such types of grouping or excluding information.

In one embodiment, a voter score is assigned to a personal GOTV drive list by averaging the voter scores of the people on the list. In various embodiments, a voter score may be based upon the average score of all individuals within a particular class or group. For example, in one embodiment, a voter score is assigned to all female voters over the age of 65 to aid in targeting likely voters. In another embodiment, voter scores are created for households.

Voter Scorecard

The voter scorecard is a new method of detailing recent voter history in a way that is easy to understand. A voter scorecard may be applied to a single voter, an embodiment of which is shown in FIG. 1.

In one embodiment, the voter scorecard takes into account that often a voter is ineligible to vote in a primary or special election. In one embodiment, the voter scorecard takes into account that young voters are ineligible to vote in any election before they turn 18 years of age. These calculations are outlined above, and their respective presentation in the voter scorecard is to display an "N/A" vote rather than a "NO" vote.

The voter scorecard may provide all the details needed to explain to a user how they got their summary voter score.

The voter scorecard may be an important aspect of the invention's overall solution to educating and motivating Americans to vote.

The voter scorecard is an improvement over voter history displays in existing field operations tools that use obscure codes such as "GE05" for general election in 2005 or applying the following numbers to each year: 1=Primary; 2=General; 3=Primary+General; 4=Special; 5=Primary+Special; 6=General+Special; and 7=Primary+General+Special.

In one embodiment, the voter scorecard may be used as a piece within an e-mail voter footer, discussed below.

In one embodiment, the voter scorecard is provided to the general public as an aspect of the personal GOTV drive subsystem, discussed below.

The voter scorecard may include the following pieces:

1. The voter's name, political party, gender, age and address. In the field operations subsystem this may be the full address, while in the personal GOTV drive subsystem this may be a partial address to protect personal privacy.

2. A list of elections in the past four years that includes the type of election (i.e. general), the date of the election, the offices voted on (i.e. mayor) and a Yes, No or N/A vote. This display is customized based on precinct to take into account local elections that are held on different dates and for different offices. Listing the offices that are voted on educates the general public.

3. Color coding may be used for easy visualization, with "Yes" votes marked green, "NIA" votes marked yellow, and "No" votes marked red.

4. An intermediate summary may be provided that includes the voter score and whether the individual votes in federal, state, local and primary elections, with the same color-coded "Yes", "No" and "N/A" values.

In one embodiment, the voter scorecard is displayed electronically, either on a website or in an e-mail. In an alternate embodiment, the voter scorecard is displayed on printed paper or provided verbally to the general public.

Post-Election Voter History

Various embodiments allow for post-election conversion analysis. Voter history data is updated after an election once the BOE has compiled and published it. This allows for post-mortem analysis of the effectiveness of a user's personal GOTV drive and verification of whether pledges were fulfilled. The user's knowledge that they will be held accountable after the election improves their participation and is key to educating and mobilizing Americans to vote.

This also allows for post-mortem analysis of the effectiveness of a campaign or an organization's staff and volunteers. For instance, a shop steward for a labor union is responsible for getting his members to the polls. Various embodiments allow measurement of his results for the first time. They also allow for post-mortem analysis of the effectiveness of various techniques, for instance measuring the relative effectiveness in motivating voters who received in-person door knocks from the candidate versus those who did not. For each class of people, a corresponding voter score can be generated, which assists in the post-mortem. For example, the average voter score of people who received in-person knocks cab be compared against the average voter score of those who did not.

This is new for existing field operations and GOTV tools and independent of the voter score, particularly with regards to the fact that earlier pledges to vote can be verified after the election, and that voter score can be assigned rather that simply counting the number of people who actually voted.

In one embodiment, a voter score can be assigned to these clusters to give a quick summary of results, allowing for an easy analysis and comparison. There are two possible methods for assigning a voter score to a cluster of voters. The preferred embodiment is to average the voter score of everyone on the list. This weights all voters equally. Take as example a cluster consisting of two voters: a Democrat who voted three times out of six opportunities to vote in the last four years (with an individual voter score of 5.0) and an non-affiliated (colloquially, independent) who voted three times but with only three opportunities to vote in the last four years (with an individual voter score of 10.0). The preferred embodiment would add 5.0 to 10.0 and divide by two to average them to a 7.5. An alternate embodiment would add up all times every voter in the cluster voted and divide by all the opportunities every voter had to vote. Thus, in the prior example, 6 votes divided by 9 opportunities results in a 6.7 voter score for the cluster.

Household Visualization

In the current embodiment another novel application of the invention is in improving householding for field operations systems.

Existing field operations systems can cross-reference voters within a household in order to influence the necessary voter. The usefulness of householding can be seen in this example: Husband James is the targeted Democrat who votes in primaries. Wife Mary is registered in the Working Families party and is unable to vote in the Democratic primary. Wife Mary is a member of the Labor Union that provided an endorsement to a candidate Bill. Various embodiments provide improvements to identify that Mary (the "receptor") is the target to be communicated with to influence James (the "actor") to vote for Bill. Qualities of James and Mary are combined to identify their household. These embodiments improve this process by providing an easy-to-absorb visual display of the household, as shown in FIGS. 2-3.

Any suitable database query, in combination with an appropriate sorting algorithm, may be employed to identify persons of influence. For example, the query may comprise finding all individuals between the ages of 55 and 75 that are registered Democrats and who have voted in the last two primaries. The results may be sorted by any manner, such as by the total number of votes the individual has cast, the total number of primaries the person voted in, the voter score, etc. Of course, the possible search and sort criteria are numerous, and are not limited to just this simple example.

The visual display may include one or more of the following pieces:

1. Additional people in a household after the first member are indented.
2. Color and font coding is used; for example, targeted voters (as defined by the campaign) may be in green with a bold font, remaining non-targeted voters may be in yellow with a normal font, and non-voters (for instance, ineligible to vote in a primary) maybe in red with italics.
3. The household is ordered with targeted voters first, non-targeted voters second, and non-voters last. A targeted voter may be identified by criteria set, for example, by the campaign, as earlier indicated. However, voter history is different than voter score. Using voter history data, targeting could be based, for example, on any Democrat that voted in the previous years primary. Thus, a target could have voted only that one time and have a voter score of 2.0, whereas a non-target voter (in this example, a Democrat) could have voted in every election except that one and have a voter score of 8.0. The letter may still be addressed to the target voter even though there is another Democrat in the household that votes on (unweighted) average more often. Also note that other factors may be used for targeting besides voter history. A female candidate may want to include more women in her targeting, and so in this example a female Democrat with a 5.0 voter score could be marked as a target, while her husband with a 7.5 voter score may not be marked as a target.
4. The household has a secondary sort order by voter score.
5. Each individual has their voter score next to their name.
6. Clicking on an individual's name brings up their info, including their full voter scorecard.

The visual display allows professionals conducting field operations to quickly understand who is in a household and their relative importance, and is an improvement over existing systems. An example screen shot of such a display is shown in FIG. 25. As shown in the figure, by clicking upon various button present in the display, the field operations staff may view the underlying data in differing formats; FIG. 25 depicts the "Full Households" format.

In the current embodiment, staff and volunteers can correct BOE data to change apartment numbers of voters, or list them as moved or deceased. A screen presented by the system which permits such changes is shown in FIG. 26. Changing addresses may not be allowed because a voter can only vote at her registered address. The allowed corrections are taken into account when generating household visualizations. It may be noted that the system itself may assign voters without apartment numbers to households as part of the data cleaning process. For example, in buildings with seven or more voters, any voter without an apartment number may be assigned to an apartment in which someone with the same last name lives. Of course, additional rules may also be applied, and an exhaustive list of such rules is beyond the scope of this disclosure. However, it should simply be noted that households can be cleaned up as part of the household visualization process.

Because of privacy issues, in preferred embodiments the personal GOTV drive subsystem does not present household visualizations. It would be an invasion of privacy to allow strangers to see who a particular voter lives with.

Household Mailing Labels

Existing field operation systems print mailing labels, with one label per household to save on postage costs. It is standard to address the label to the household, for instance "The Addams Family" or "Mr. and Ms. Smith". Various embodiments improve this process by addressing mailing labels to the best individual(s) in the household. An example set of mailing labels is shown in FIG. 34.

Preferred embodiments intelligently and automatically place the best name on the mailing label, rather than address it generally to a household or to "Mr. and Mrs." Or the like. In the current embodiment, the top-ranked voter is chosen, as outlined above (sorted by target voter/non-target voter/non-voter and then by voter score). An alternate embodiment would be to include all targeted voters on the label, in order of voter score. Another alternate embodiment would be to include both the top-ranked voter (the "actor") and the "receptor" individual on the label.

Appropriate selection of individuals is important for two reasons. Mail addressed to a specific individual is more likely to be opened (by anyone in the household) than when addressed to the household, because it looks less like junk mail and because group responsibility is nobody's responsibility. In addition, having a letter opened by a non-target voter and especially a non-voter has no impact and is a waste of campaign resources.

E-Mail Voter Footer

A novel aspect of the invention is the inclusion of a detailed e-mail voter footer on every e-mail sent by the system, an embodiment of which is shown in FIG. 4.

The field operations subsystem may allow for e-mail blasts with these footers. The personal GOTV drive subsystem may allow users to send e-mails to their friends and family on their list, with the footers included therein as well.

Currently no such system in any capacity exists outside of the invention. Other systems will link e-mails to voter records but only for internal purposes, such as sending a targeted e-mail blast. Voter history, voter record, and information derived from these sources are never shared with the general public.

To make certain aspects of the e-mail voter footer work, a link may first be established as outlined below in e-mail linking to voter score, voter scorecard, full voter record and additional information about the voter.

In certain embodiments of the invention, the e-mail voter footer may contain some or all of the following information specific to the voter receiving the e-mail, and in the case of the personal GOTV drive subsystem, the user who is sending the e-mail:

1. The name of the individual sending and receiving the e-mail.
2. Information on the organization hosting the invention, including the organization's name, their slogan, and a link to their website.
3. The voter score and a link to the voter scorecard of the e-mail recipient. The link helps drive traffic to the embodiment system and helps encourage the recipient to join herself.
4. In the case of the personal GOTV drive subsystem, the voter score and a link to the voter scorecard of the e-mail sender.
5. The list of upcoming election dates that the e-mail recipient is eligible to vote in, taking into account their individual party affiliation and districts (House, State Senate, etc.).
6. Political party and partial address of where the e-mail recipient is registered to vote. Many voters don't remember or aren't aware of their party registration. Only the street or city is listed to protect personal privacy, but this is still local enough to remind the e-mail recipient if she has forgotten to update her registration after a recent move.

7. The e-mail recipient's pollsite (where to vote) including the address, the name (i.e. public school 321) and a link to a map (for instance, an external site like MapQuest).

8. In the case of the personal GOTV drive subsystem, the e-mail senders personal endorsement of a candidate, including the name, election race (i.e. mayor), a link to the candidate's website, whether the endorsement is for the primary or general election, and a personal endorsement reason written by the sender. The sender is allowed to endorse any one single candidate, including the opponents of the candidates that the organization is endorsing. This provides all users incentive to actively send e-mails. At the same time this still provides a net benefit to the organization: since the user only has one endorsement, the recipient is more likely to vote as the organization hopes in the other races; the recipient is more likely to show up to the polls if a friend has a good reason for the opposing endorsement, and thus more likely to be present to have the opportunity to vote in the other races; and finally the recipient is still exposed to the organization's endorsement and might be persuaded to support when otherwise he wouldn't have a reason to. This piece is important to user participation and proper balance between the two subsystems. It is counterintuitive at first, and does not exist outside the system.

9. The organization's endorsements of all candidates that the e-mail recipient is eligible to vote for, personalized by party affiliation (in the case of a primary election) and districts. These endorsements include the name of the candidate, election race, a link to the candidate's website, whether the endorsement is for the primary or general election, and an endorsement reason written by the organization. The endorsement reason can be personalized based on the motivating issues identified with that voter. For instance, if the organization is a gay rights group, it might have identified in the system that a voter cares about AIDS research funding, so that voter would receive endorsement reasons on why the candidates are good with that. Another voter might care about same-sex marriage, so the endorsement reasons would focus on that. Voters who have not been ID'ed might receive more generic reasons.

10. In cases where the e-mail recipient is not a registered voter, a link is included to the appropriate BOE website where they can register.

In an alternate embodiment, the e-mail voter footer can include information from both the field operations and personal GOTV drive subsystems, such as whether the recipient has pledged to vote, answered a survey or poll, or sent an online petition to the recipient's elected representatives.

In the current embodiment, the personal GOTV drive subsystem provides the option for the user to send to the e-mail recipient his full voter scorecard without having to click on a link.

E-mail Linking to Voter Score, Voter Scorecard, Full Voter Record and Additional Information about the Voter Various embodiments provide a system that links users' e-mail addresses to their voter score, their voter scorecard, their full voter record, and any additional information in the system about the individual collected from additional sources (for instance, their phone numbers or their interest in motivating issues). The link to voter score and scorecard is an improvement over existing field operations systems. The full link is entirely new to personal GOTV drive systems.

Voter email addresses may be obtained by a number of paths including, but not limited to: importation of other databases such as Sierra Club Mailing List, Local Plumbers Union Member Rolls, The State Democratic Party Database, AARP Database, etc.; participants entering their own e-mails or those of their friends and family while using an embodiment personal GOTV drive subsystem; users of an embodiment field operations application entering e-mails from political petitions or event attendance sheets.

In an embodiment of the field operations subsystem, users are provided a "Fuzzy Logic" search on names and addresses that returns close but imperfect matches. A screen shot depicting such a fuzzy search is shown in FIG. 32. In one embodiment, the fuzzy logic will look for everyone with the same first and last name, everyone with the same last name that lives on that street, and everyone with the same first and last initials that lives in that building. This both speeds the matching process and increases the number of matches. This is an improvement over existing field operation tools.

In one embodiment, the e-mail link allows for automatic demographic, geographic and political analysis of an organization's e-mail list ("members") or a user's voter list of friends and family. This analysis automatically provides: 1) the number of members who are voters and primary voters; 2) the number of members who live in various geographic areas (such as counties or in NYC) and districts (such as House or State Senate), cross-referenced by political party affiliation; 3) the percentage of members in various demographic groups, such as gender or age; and 4) the percentage of members who have voted in past elections (for instance, the percent that voted for president in 2004). An example analysis is shown in FIGS. 19-20.

Figure 13:
FIG. 13 shows an embodiment screen that presents information about a voter and permits the member to add the found voter to the list of friends and family, or to link the found voter record to his or her account.

In certain embodiments of the personal GOTV drive application, users are required to confirm hidden personal data to prevent intentional false links. This is shown, for example, in FIG. 13. FIG. 13 shows a webpage presented by the system in response to a member searching for a friend or family. By clicking on a link presented in response to the search, the system presents to the member a webpage about a voter which, by clicking upon the appropriate button, permits the member classify the voter as a friend, or as the member himself. In the later case, the member must provide certain additional identifying information known to the system from, for example, the BOE data but not generally known to the public. Once properly identified, the information related to the voter record is linked to the member's account.

Personal GOTV Drive Subsystem

The personal GOTV drive subsystem allows for the general public to access voter information to empower them to get their friends and family to vote, and to influence their vote.

The personal GOTV drive subsystem may be configured by an organization, which may identify issues of importance, such as pending or current legislation, elections and officials, and the like. These issues may be implicitly or explicitly propagated throughout the personal GOTV drive subsystem so that members joining the system are also made aware of these issues, can easily comment on these issues with their friends and family, can forward e-mails and newsletters distributed by the organization to their friends and families, and the like.

Figure 6:
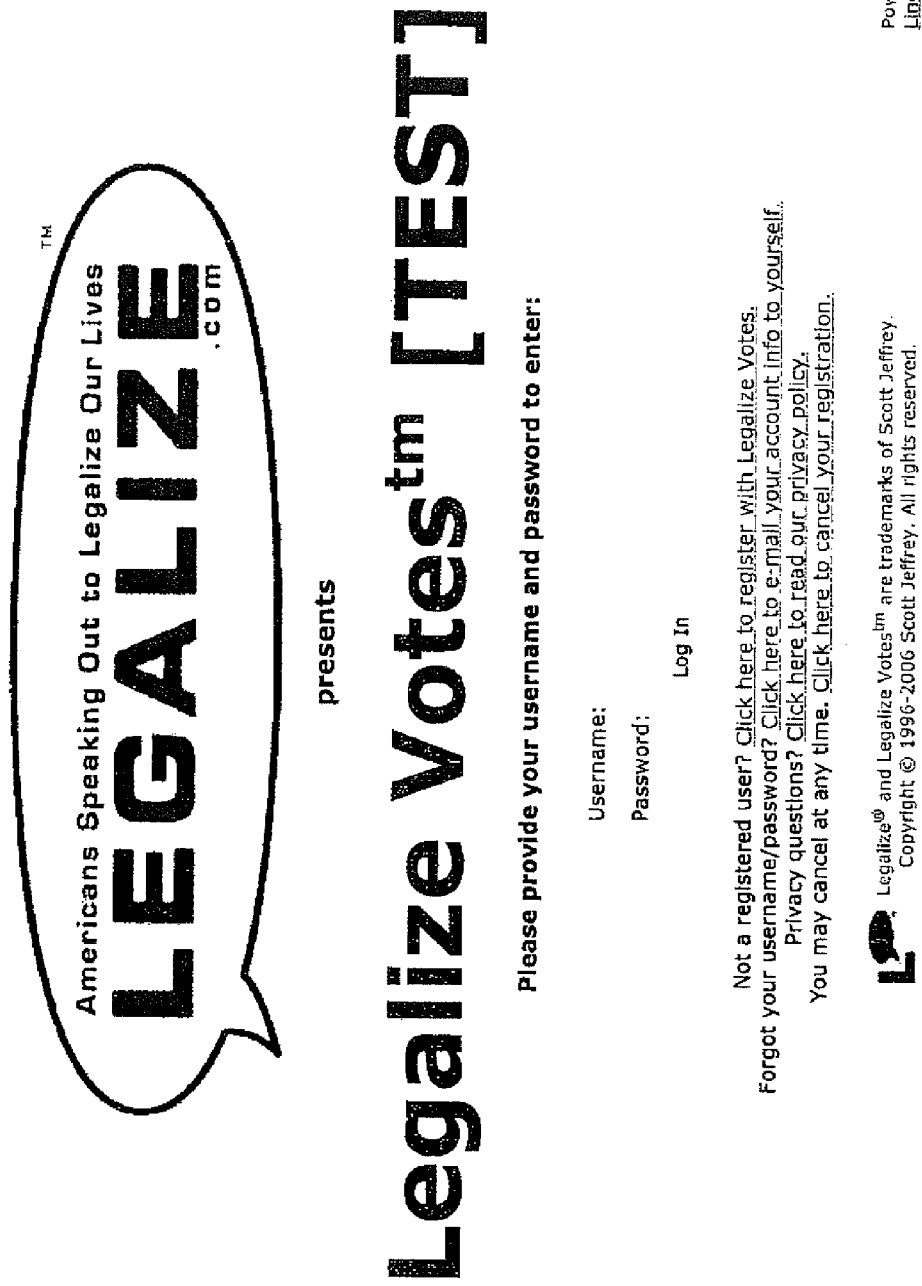
FIG. 6 shows an embodiment user login page.
Figure 9:
FIG. 9 shows an embodiment screen that permits a member to edit their endorsement information.

As an initial step, and as shown in FIG. 6, the personal GOTV drive subsystem may include a login page that permits the system to identify a user and subsequently grant that user access to the various functionalities of the system. A standard username and password combination may be employed for this purpose. If the user has not registered with the system as a member, then a link may be provided that permits the user to register and so provide the system with contact and personal information, which may be made available to the organization. Such a registration screen is shown in FIG. 7. As shown in FIG. 7, the user may provide their name, e-mail address and desired user name. The user also has the option of immediately linking to their voter records, or to skip this process and join as a non-registered user. As discussed elsewhere, to link to a voter record, the user must provide certain pieces of private information that are not generally known to the public, but which are known by the system, such as a middle initial, month and year of birth, and building number. If the user is able to match this information, then the information from the related voter record may be populated into the user account information or otherwise linked to the user. As shown in FIG. 8, the system may permit a new member to edit their account information (such as physical address, e-mail address, password and the like). The user may also indicate, by clicking on the appropriate tab and entering information into the resultant webpage, their views on various issues, such as those identified by the organization. Such a webpage is shown in FIG. 9, which shows that the user may indicate a candidate that he or she endorses, and which, for example, may then be incorporated into the e-mail footer when the user employs the e-mailing utilities of the system.

One characteristic of the personal GOTV drive subsystem is that it uses and combines a voter list of friends and family along with the e-mail voter footer. It also incorporates pledges to vote and e-mail blast forwarding. Finally, it handles personal privacy issues surrounding making public record voter data available to the general public.

In various embodiments, the personal GOTV drive subsystem interacts with the field operations subsystem via a subsystem interface. This allows the general public to participate in a field operations subsystem without violating the personal privacy between the user and the campaign or organization. It also allows this without compromising confidential campaign information in the field operations subsystem.

In certain embodiments, the general public can view reports that show how many users have pledged to vote, as well as how many individuals on their voter list of friends and family have pledged. FIGS. 21-23 present an example screen shot of such a pledge report. The system also allows for goals to be set and to compare results to those goals.

In the current embodiment, the general public can use the system to send e-mails to anyone on any topic, which automatically includes the e-mail voter footer.

Voter List of Friends and Family

Embodiment personal GOTV drive applications allow a user to build and maintain a list of friends and family for the purpose of getting them to vote, and to influence who they vote for. Various preferred embodiments have a general principle around the Friends and Family list: the member who is building the list is not registering his friends (or family) with the organization. He or she does not have their permission (or at least the organization has no way of confirming such permission). Thus, the organization is not allowed to know anything about these friends or family. In addition, the organization cannot contact or e-mail the friends or family directly. All communication passes through the member, who can forward it along if he or she chooses. Thus, the forwarded e-mail comes from the member, even though it is generated and sent via the organization's system.

As shown in FIG. 10, the user is able to search by first and last name, and by county, to find voter records of their friends and family. The user is presented a list of possible matches, with the gender, age, political party, voter score, and partial address given to enable the user to ascertain who their friend or family member is amongst a list of voters with the same name.

Figure 11:
FIG. 11 shows an embodiment screen that permits a user to create a new record of a friend or family member as an unregistered non-voter.

The user can then click a check box to mark the voter as a "friend," as previously indicated with reference to FIG. 13. The voter will then appear in the user's voter list of friends and family. FIG. 12 depicts a list of friends and family presented by the system, as generated by a member. If the friend or family member is not a registered voter, the user has the ability to create a "non-voter record" that then also appears in their voter list, as shown in FIG. 11.

Figure 17:
FIG. 17 shows an embodiment screen that permits a member to send e-mails, such as to voters on the list of friends and family.

The user can also assign e-mail addresses to those on their voter list, as shown in FIG. 13. The user can send emails through the system to one, all, or selected friends and family on their list, as shown in FIG. 17, such as by clicking on a send e-mail button, as shown in FIG. 12. These e-mails are tracked by the system so the user can see the last e-mail sent, all e-mails sent, and the date and subject line of all e-mails.

Figure 15:
FIG. 15 shows an embodiment screen when viewing the endorsements of a voter that is not a mutual friend.
Figure 16:
FIG. 16 shows an embodiment screen when viewing the voter history of a voter, such as a voter in the list of friends and family.

The user is also able to enter information, as shown in FIG. 14, and track his friends and family in the same manner as the field operations subsystem, such as whether they have pledged to vote, what issues they care about, etc. This information is only visible to the particular user who entered it. With specific reference to FIG. 14, the member may enter information about a friend or family voter by clicking, for example, on boxes or the like. These boxes and attendant descriptive text may be set up, for example, by the organization as issues of importance as identified by that organization. As a convenience for the member as a user of the system, and as shown in FIGS. 13-16, when a member is browsing the database for information about another voter, friend or family, tabs may be presented that permit the member to quickly navigate between various screens. For example, by clicking on a "Friend's E-Mail" tab, the member may be taken to a screen such as that shown in FIG. 13, and enter the friends e-mail address therein. The system may present the contact history of the member with that friend, such as by listing the subject lines of all emails sent to the friend. FIG. 14 shows a screen that is present when the "Friend's Profile" tab is clicked. FIG. 16 shows a screen that is depicted when the "Voter History" tab is clicked. As shown in FIG. 16, the screen presented may include the results of an embodiment voter history analysis of the friend or family member, and an embodiment voter score. FIG. 15 shows a screen that may be presented when a "Friend's Endorsement" tab is clicked. As will be discussed later, only mutual friends may see their respective endorsements information due to issues of privacy.

If a friend subsequently registers with the system and enters information about himself, this information will override what the user entered about the individual. In certain embodiments, the changes in information is reflected only as to what the organization sees; the member may continue to see the information that the member input about that friend. How the system differentiates between information entered by a member about, for example, a friend, and the information that such friend enters about themselves is covered in more detail later.

In preferred embodiments, the user's voter list of friends and family is kept private from other users, and from the sponsoring organization. However, aggregate summary information, such as the total number of people on the list or the number of e-mails sent, may be made available to the sponsoring Organization. An example aggregate summary list is shown in FIG. 40.

Pledges to Vote

Various embodiment personal GOTV drive applications allow a user to pledge to vote, both for an election (i.e. special, primary, or general) and for endorsed candidates. These embodiments may also allow users to mark their friends and family as having pledged to vote, which is an improvement over existing GOTV systems.

Making a pledge increases the likelihood of the individual going to vote on election day. Collecting pledges helps remind friends and family to vote.

Some embodiments automatically know which local candidates an individual can vote for, for example by cross-referencing BOE-supplied data and internal databases. This is an improvement over existing GOTV tools.

Certain embodiments display the total number of pledges to vote, both for elections and for endorsed candidates, as shown in FIGS. 21-23. This encourages users of the system to pledge themselves and collect pledges. This is an improvement over existing GOTV tools.

Pledging to vote is an improvement to existing field operations systems, which do not allow for individuals external from the campaign to have access to the system.

Personal Privacy with the Personal GOTV Drive Subsystem

The personal GOTV drive subsystem allows the general public to search for voters and build a list of friends and family without violating privacy. It also allows users to link to their own voter record by providing verification information, again without violating privacy.

In one embodiment, the system blocks the general public from:

1. Seeing apartment numbers and house numbers of voters. In some regions, the street name may also be blocked and only the city displayed. For instance, if a voter lives at "350 Fifth Ave, Apt #10D, New York, N.Y." the personal GOTV drive subsystem will only display "Fifth Ave, New York, N.Y.".

2. Seeing who lives with an individual.

3. Seeing everyone who lives in a particular building.

4. Seeing birthdates. An age is displayed that is only updated on the first of every month.

5. Seeing middle initials.

6. Users have an enhanced privacy option that blocks both street and pollsite location for additional protection.

7. A configuration option exists to allow users to see or hide the fact that their friends and family are also users of the system, and thus members of the organization.

Various embodiments provide a technique that allows users to link to their voter record, while at the same time not violating the above privacy rules. Because some information that the general public user enters about himself is visible to other users and to the sponsoring organization, it is important to prevent users from "masquerading" as someone else. To make the link, the user is required to provide his middle initial, house number, and month and year of birth, as shown and previously discussed with reference to FIG. 13. If the information is incorrect, the user is not told which parts are wrong. This prevents the linking mechanism from being used to ascertain private information. Such verification techniques may also be performed during registration of a user, as shown in FIG. 7.

It is useful to think of this verification as using the voter data itself as a "password" for the general public to safely enter into the field operations system.

In an alternate embodiment, a different combination of private data can be used, for instance using the day and month of birth.

In the current embodiment, certain searches are prevented to protect privacy, for instance the general public is not allowed to search by address.

E-Mail Blast Forwarding

It is common for field operations systems to include a link allowing the recipient to forward the organization's e-mail blasts to their friends and family. E-mail blasts are announcements, action alerts, invites, etc. sent by the organization to their e-mail list of members. An'example e-mail blast generator screen is shown in FIG. 38.

Various embodiments provide improvements over existing mail forwarding systems in two ways. One is that the forward list is made permanent, so the user doesn't have to reenter e-mails every time, increasing the likelihood of participation. In addition, the forwarded e-mail automatically substitutes the e-mail voter footer from what the user received to instead use one customized to the new recipient. The e-mail blast screen may also include additional header and footer information to provide for a general "look and feel" of the message, such as setting background colors or patterns, inserted images and the like.

Figure 18:
FIG. 18 shows a preview screen of an example forwarded e-mail about to be sent by a member.

In one embodiment, the user can forward an e-mail blast to one, all, or selected individuals on her voter list of friends and family, as shown in FIG. 18. In another embodiment, the user can add her own comments to the top of the e-mail, so for instance if the e-mail blast is an invite to a fundraiser, the user can add the she will be attending and personally encourage her friends to come.

Figure 24:
FIG. 24 shows a screen shot of a member forwarding a pre-written e-mail to another person.

As shown in FIG. 24, in some embodiments the user can also "forward" prewritten e-mails defined by the organization, such as a request to pledge to vote, a reminder to vote, a "who we are" analysis of membership, or the recipient's full voter scorecard.

The e-mail blast forwarding may also include a link at the bottom to block e-mails sent from that particular user. For example, such a link is shown in the e-mail footer shown in FIG. 4. This still allows the recipient to receive forwarded e-mails from other users in the system, or if the recipient is also a member of the organization, to still receive the e-mail blasts.

In one embodiment, this is achieved by tracking the voter ID of the sender and the e-mail of the recipient. This prevents the sender from getting around a block by change his own e-mail address. In one embodiment, the system assigns a unique ID to every voter ID and e-mail combination, includes it on the block link and tracks this in the database. This helps prevent a malicious hacker from blocking e-mails of other users.

Voter Support Visualization

Voter support visualization allows staff and volunteers conducting field operations to quickly understand support for a candidate or an issue by clusters of voters, and is an improvement over existing systems. The cluster could be but is not limited to a district, a precinct, everyone that the campaign has contacted, or everyone on the campaign's e-mail list. An example display is shown in FIG. 5.

This display also allows for the general public conducting a personal GOTV drive to quickly understand support for a candidate or an issue by clusters of voters, and is a new invention for this purpose. The cluster could be but is not limited to the membership of the organization or the user's voter list of friends and family.

In various embodiments, the display of voter support visualization may include the following pieces:

1. Color coding is used, with strong support in green, lean support and undecided in yellow, and lean oppose and strong oppose in red. The build-in imbalance with lean support assigned to yellow rather than green is done for a couple of reasons. In field operations, lean supports and those who are undecided are both groups that the campaign attempts to persuade, hence yellow to indicate "caution," while it is considered a waste of resources to attempt to persuade a voter at any level of opposition, hence red to indicate "stop." Also, when lobbying for an issue, only strong supports will take action to help, hence green to indicate "go," while both lean oppose and strong oppose need to be overcome, hence red to indicate "stop." Finally, "hate trumps hope" in general with politics, and this imbalance captures that reality.

2. A title bar of the five levels of support is presented at the top of the visualization. This includes a 1 through 5 numeric rating assigned to five levels of support, as is standard in field operations. The title bar is color coded along with the results below. The titles are presented in proportion of 20% each so the viewer can immediately see how the actual results compare to balanced results. The title bar does not explicitly explain how to interpret the results below, but it is implicitly grasped by the viewer after a moment or two.

3. The results are scaled proportionately to their percentage, with the actual percentage presented inside the bar. The system hides the percentage sign when the result is under 5% to keep this spacing proportional. At 0% and 1%, 0 and 1 are displayed respectively, which does distort the results slightly. This is done because in a visualization, absorbing information immediately is more important than minor inaccuracies. An alternate embodiment could use a smaller font or not display the 0 or 1 at all.

4. White slivers are placed between each level of support so adjacent yellows and reds can be distinguished. Again this distorts the results slightly and is done because absorbing information immediately is more important than minor inaccuracies. An alternate embodiment could use different shades of yellow and red to avoid the white slivers altogether.

Subsystem Interface

A third aspect of the invention is the subsystem interface that allows both the field operations and personal GOTV drive subsystems to coexist together.

Features of embodiment subsystem interfaces are:

1. Keeping the general public's voter list of friends and family private so the sponsoring campaign or organization cannot access these lists.

Figure 27:
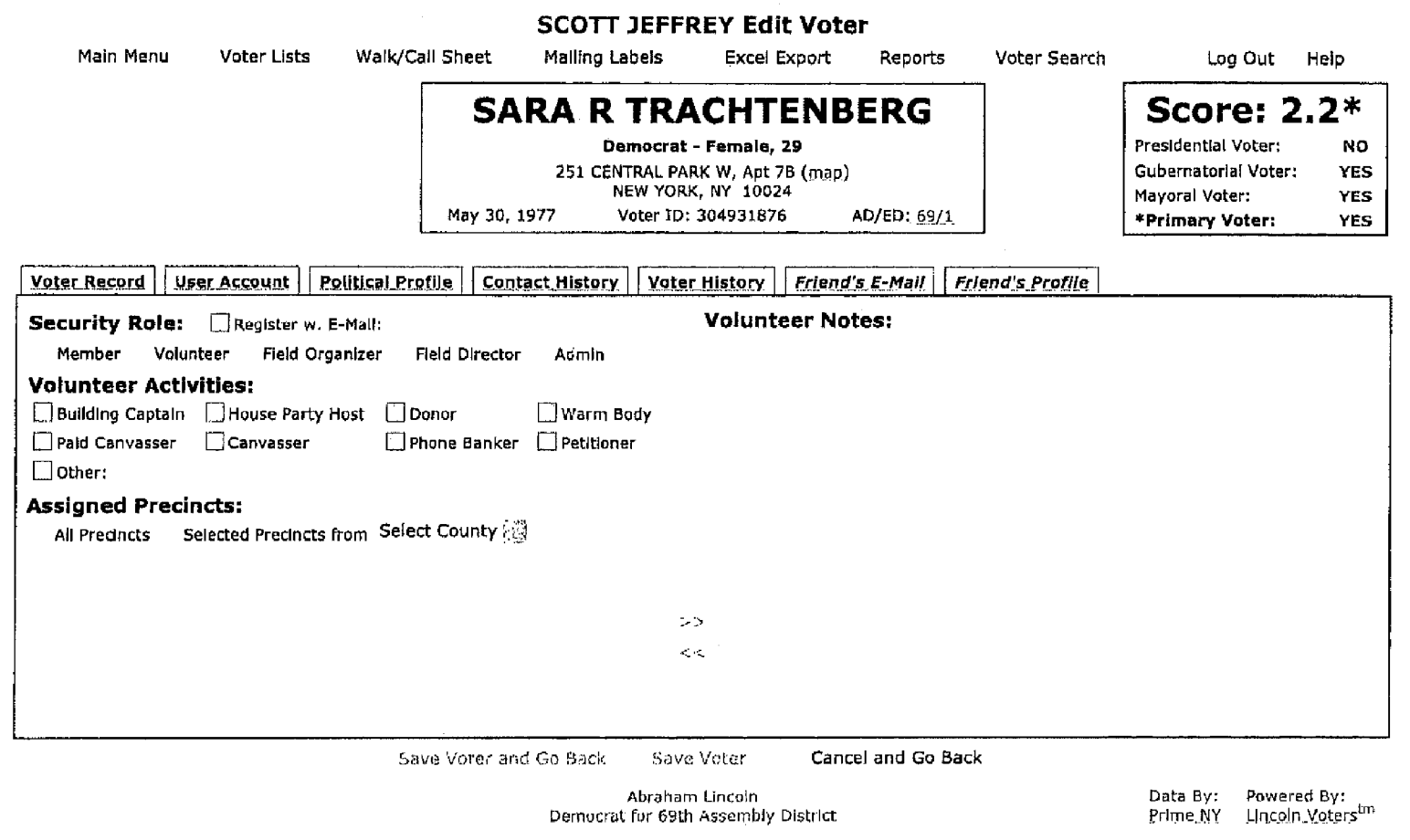

2. Allowing the sponsoring organization to promote a general public user to volunteer status, granting access to the field operation subsystem. The system also allows for demotions. A screen depicting this internal management tool is shown in FIG. 27. As shown in FIG. 27, the role of the user can be set. A member has no access to confidential organizational records. A volunteer can access such confidential records. A field organizer can create new volunteers and field organizers and in some embodiments print mailing labels and export data to a spreadsheet. A field director can send e-mail blasts and create new field directors. An administrator can backup, restore or optimize databases among other system functions. Additionally, the confidential information that a volunteer can view may be restricted, for example, by precinct, as indicated by the "Assigned Precincts" field.

3. Providing a configuration option that allows the organization to view information that general public users enter about themselves (not their friends) and to disallow the organization from changing such information.

4. Allowing for parallel but independent data tracking, so general public users can enter information about friends that is hidden from and can contradict information entered by other general public users or by the sponsoring organization, and vice versa. For example, as shown in FIGS. 28-29, field operations personnel may indicate information about a voter which the voter may not be able to see. For example, in FIG. 28 the field operations personnel may enter political profile information, while in FIG. 29 they may enter contact history information and a summary of the results thereof. As shown in FIGS. 30-31, which are analogous to FIGS. 13-14, organization personnel may add a voter to the organization's voter list, and may edit the political profile of a voter so added.

Besides hiding personal aspects of the public voter records from the general public, various embodiments also hide certain information entered by general public users from the field operations staff and volunteers. In general, information entered by the general public about themselves is visible to staff and volunteers, while information entered by the general public about their friends and family is hidden.

In some embodiments, as shown in FIG. 14, the general public can identify and track information about their friends and family. This allows the public to better motivate their friends and family to vote, and to better influence who they vote for. For instance, a user might be able to mark some friends as caring about same-sex marriage while others care about legalizing marijuana. If the user wants to forward an announcement about the Federal Marriage Amendment, he could easily filter his list to only send to the friends and family who care about that issue (rather than sending to all and annoying those that don't care, or having to select individually from memory each time).

This information about the friends and family is kept private from both other users, and from the sponsoring organization's field operations team. In one embodiment, this is achieved by including a "Friend ID" field in the database tables. If set to a predefined value, such as zero or blank, then this is public information. If set to a voter ID value, then only that voter has access to this information.

As a general matter, and as known in the field of relational database programming, the system may include a database that holds a plurality of records. Each record may hold information about, for example, a voter or a user of the system. This information may be contained in fields within the record. Cross-referencing of fields across records is a fundamental basis of relational databases, and permits data to be correlated and aggregated across multiple records over multiple files. In particular, in various embodiments, in addition to other data fields that hold information about a voter, each record is provided two other fields: a voter ID field and a friend ID field. The voter ID field identifies who the record is about, and contains the voter ID value of the individual described by information contained within the record. The friend ID field indicates who created the record, and contains the voter ID value of the person that placed the information into the fields of the record or caused the record to be made. The organization may be given a unique, predefined voter ID of, for example, zero or blank. Hence, any information originating from the organization may have a corresponding friend ID value of zero. The BOE data, for example, or other data collected by the organization, may be given a friend ID of zero. Information entered by the volunteers or other staff of the organization in their capacity as such may also be given a friend ID value of zero. On the other hand, information entered by users about themselves or other voters is given a friend ID of the user so providing the information. Additionally, information entered by volunteers or staff of the organization that is personal in nature and refers to their own friends and family list may be given a friend ID of that volunteer or staff member, rather than the predefined value of the organization. When a non-voter is added to the system, the corresponding record may be assigned a bogus voter ID, such as "novote000001".

Because it is generally assumed that information that a user enters about himself or herself may be passed on to the organization, any record that has a friend ID value that matches the voter ID value for that record may be viewed by the organization. Similarly, any record that has a friend ID value equal to the person requesting that record may be viewed by that person, but not by any other, including the organization.

Hence, for example, a record created by a user John about a user Smith would have a voter ID field for "Smith", but a friend ID field for "John." John may view the record, as the friend ID field is the same as his voter ID. Smith, however, may not, nor may the organization, as their respective voter IDs do not match the friend ID for John. Note that when Smith creates a similar record about himself, however, this record may be seen by the organization, as the friend ID field for this record would match the voter ID field for the record. John, however, would not be able to see the record. It is therefore possible for a member to store formation about a voter that is, in fact, contrary to what that voter has actually said about himself or herself. Privacy between users and the organization is thus maintained by reference to the friend ID and voter ID fields within the records.

A distinction may be drawn between voter record (reference) data from the BOE and field operations (user) data entered by the campaign or organization. The rules outlined above may apply to field operations data. For voter data, the rules may be changed somewhat. For voter data, there may be two tables that are identical in structure: the voter table and the supporter table. The voter table may have voter records with, for example, a zero in the friend ID field. The supporter table includes non-voters entered into the system. The friend ID may be set to the voter ID of the user who entered the information if the user is creating a "private friend". Otherwise, the information is being entered for field operations and is stored with a blank or zero friend ID. Members can only see records in the supporter table whose friend ID matches their voter ID—they cannot see records with blank or zero friend IDs. Members can see all records in the voter table (although some fields in these records may be hidden, such as the apartment number)—note again that all these records may have blank or zero friend IDs. Volunteers (and up) can see records in the supporter table with blank friend IDs, friend IDs that match their own voter ID, and friend IDs that match the voter IDs in the same record. Volunteers can also see all records in the voter table. So, for the supporter table, the standard rules apply: it is user-entered data after all. The voter table is the exception, due to its being reference data, and in this case any user may see the data, except for certain pre-defined hidden fields that are made unavailable for privacy-related reasons.

In another embodiment, as shown in FIG. 7, new users who register their e-mails are presented the option to link immediately to their voter record, or to simply join and link later. As shown in FIG. 8, in such case the new member may enter information about himself, which is entered into the database and made available to the organization. This also allows individuals who are not registered to vote to join the system as a user, and to then build their own voter list of friends and family.

When a "non-voter user" links to her voter record, the system must properly transfer information, including what the user entered about herself, what she entered about her friends and family, and what the staff and volunteers entered about her. This transfer can also occur in both directions (from non-voter to voter, and voter to non-voter) when more up-to-date BOE data is put into the system, as is done periodically.

In one embodiment, all of this is achieved by creating a non-voter record that parallels the true voter records in internal structure and external function and display. If enough information is provided, this non-voter record can be connected to actual voters in a household.

In one embodiment, this non-voter record is also used to add friends and family who are not yet registered to the voter list of friends and family. This allows e-mails to be sent to anyone, and encourages those who are not registered to get registered. These "non-voter friends" are completely hidden from the staff and volunteers (in other words, not just the friend relationship, but even the existence of these non-voters).

In another embodiment, a configuration option exists to allow information a user enters about himself to be seen by all users, by no other users, or by "Mutual Friends". Mutual friends are defined as two users who have included each other on their voter list of friends and family. Even in this case, mutual friends can only see information about themselves (including e-mail addresses) but not information on anyone else on the other's voter list. For example, as shown in FIG. 15, mutual friends may view each other's endorsements.

The generation of walksheets for canvassing purposes is known, and may be provided by various embodiments of the GOTV drive sub-system. For example, as shown in FIG. 33, data sheets may be printed for the benefit of canvassers, which contain the relevant information of each voter to be contacted, and offers columns with related elements to record views obtained from the voter. These sheets may be automatically generated by the system, following, for example, the intended route of the canvasser. As shown in FIG. 35, summaries may be made of the various sections of a neighborhood, such as by building, street, precinct or the like, which may be sorted to permit canvassers to determine the most likely regions to target. FIG. 36 shows a typical walk sheet that provides a broad overview for the canvasser of the route to take. The route may include numerous legs, and each leg may be provided a summary, such as the total number of "My Targets" on that leg, the total number of "My Voters" on that leg, and the total number of registered voters. However, in some embodiments, a voter score may also be attached to each leg. The voter score may be based upon, for example, the average voter score of any group or sub-group within that leg.

The exporting of data from a database is also known, and may also be provided by the system. For example, FIG. 37 illustrates the exportation of a voter list into a spreadsheet format.

Although the organization may be prevented from viewing certain private information of the users, as previously discussed, information about a user made available to the organization by that user may be viewed. This information may include, for example, login dates and times. Hence, in some aspects, the system may permit the organization to view the login logs of the users, as shown in FIG. 39. Also, non-personal aggregate information may also be presented to the organization. For example, the organization may see how many people a user has in their list of friends and family (though not the actual identities of the people therein), and the number of e-mails sent. Similarly, the organization may see how many people have linked to a user (i.e., have that user in their list of friends and family), and how many e-mails that user has received. An example screen shot of such information is shown in FIG. 40, as previously discussed.

Alternate Embodiments

The Internet shown here is the well known network of computers which now virtually ubiquitously enables data communications all over the world. Other types of data networks may be used in place of the Internet.

Although only a single user is shown here, it will recognized that a large number of users may be connected to the Lincoln Voters invention at different times and/or simultaneously.

Still further, hardware implementations using different hardware components may be used other than those described herein. Also, other databases or data structures may be used than those described herein.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. An apparatus for encouraging voter participation in elections, the apparatus comprising:
    a server adapted for networked communications to receive information from and send information to a plurality of users;
    a database, in which at least voter-related data relating to at least one of the users of the plurality of users is stored; and
    an application code, operable by the server and which performs at least the steps of:
        creating a member account;
        importing the voter-related data into the database;
        vetting the voter-related data for errors and omissions;
        searching of the voter-related data; and
        creating a voter list associated with the member account using results from the searching;
    wherein the step of vetting the voter-related data comprises checking for internal inconsistencies, external inconsistencies, anomalies and patterns, and
    wherein precinct information, address information or name information in the voter-related data is used to determine if two differently-named streets are the same street.

2. The apparatus of claim 1 wherein the application code further performs the step of:
    sending correspondence to a user associated with a member account.

3. The apparatus of claim 2 wherein the step of sending correspondence to the user associated with the member account comprises an additional step of:
    attaching additional information to the correspondence.

4. The apparatus of claim 3 wherein the additional information comprises at least one of:
    a voter score of the user sending the correspondence,
    a voter score of an intended recipient of the correspondence,
    a poll site location of the intended recipient of the correspondence,
    at least one endorsed candidate, and
    information in support of at least one of the endorsed candidates.

5. The apparatus of claim 2 wherein the application code further performs the steps of:
    utilizing the voter-related data to determine a precinct of the intended recipient of the correspondence;
    selecting from a list of potential candidates at least one candidate that can be voted upon in the precinct of the intended recipient of the correspondence; and
    incorporating the at least one selected candidate as an endorsed candidate within the correspondence.

6. The apparatus of claim 1 wherein the application code further performs the step of:
    linking of a member account to at least a corresponding record in the voter-related data.

7. The apparatus of claim 6 wherein linking of the member account to at least a corresponding record in the voter-related data comprises an additional step of:
    requesting information from a user of the member account that is verifiable according to at least the corresponding record in the database.

8. The apparatus of claim 1 wherein the voter list comprises a plurality of links corresponding to records in the database.

9. An apparatus for a voter participation system, the apparatus comprising:
    a server adapted for networked communications to receive information from and send information to a plurality of users;
    a database, in which at least voter-related data is stored; and
    an application code, operable by the server and which performs at least the steps of:
        creating a member account corresponding to at least one user of the plurality of users;
        searching of the voter-related data;
        creating a voter list associated with the member account using results from the searching; and
        utilizing the voter-related data to determine a precinct of the intended recipient of the information.

10. The apparatus of claim 9, wherein the application code further performs the steps of:
    selecting from a list of potential candidates at least one candidate that can be voted upon in the precinct of the intended recipient of the information; and
    incorporating the at least one selected candidate as an endorsed candidate within the information.

11. The apparatus of claim 9, wherein the information comprises at least one of:
    a voter score of the user sending the information;
    a voter score of an intended recipient of the information;
    a poll site location of the intended recipient of the information;
    at least one endorsed candidate; and
    additional information in support of at least one of the endorsed candidates.

* * * * *